US010321161B2

(12) United States Patent
Rossato et al.

(10) Patent No.: US 10,321,161 B2
(45) Date of Patent: Jun. 11, 2019

(54) SIGNAL ANALYSIS AND GENERATION OF TRANSIENT INFORMATION

(71) Applicant: V-NOVA INTERNATIONAL LIMITED, London (GB)

(72) Inventors: Luca Rossato, Milan (IT); Guido Meardi, Milan (IT)

(73) Assignee: V-NOVA INTERNATIONAL LIMITED, London (GB)

(*) Notice: Subject to any disclaimer, the term of this patent is extended or adjusted under 35 U.S.C. 154(b) by 24 days.

(21) Appl. No.: 15/296,633

(22) Filed: Oct. 18, 2016

(65) Prior Publication Data

US 2017/0041639 A1 Feb. 9, 2017

Related U.S. Application Data

(62) Division of application No. 13/352,944, filed on Jan. 18, 2012, now Pat. No. 9,510,018.

(60) Provisional application No. 61/563,169, filed on Nov. 23, 2011.

(51) Int. Cl.
*H04N 19/80* (2014.01)
*H04N 19/51* (2014.01)
*H04N 19/85* (2014.01)

(52) U.S. Cl.
CPC .......... *H04N 19/80* (2014.11); *H04N 19/51* (2014.11); *H04N 19/85* (2014.11)

(58) Field of Classification Search
None
See application file for complete search history.

(56) References Cited

U.S. PATENT DOCUMENTS

| 5,293,580 | A | * | 3/1994 | Shimizu | H04N 7/24 |
| | | | | | 375/240.01 |
| 5,748,231 | A | | 5/1998 | Park et al. | |
| 6,072,830 | A | * | 6/2000 | Proctor | G06T 9/008 |
| | | | | | 375/240.22 |

(Continued)

FOREIGN PATENT DOCUMENTS

| CN | 1450811 A | 10/2003 |
| CN | 1762160 A | 4/2006 |

(Continued)

OTHER PUBLICATIONS

Notice of Rejection, JP 2014-542984, dated Dec. 16, 2016, pp. 2.

(Continued)

*Primary Examiner* — Frederick D Bailey
(74) *Attorney, Agent, or Firm* — Workman Nydegger

(57) ABSTRACT

A signal processor receives settings information. The settings information specifies a setting of a given element for each image in a sequence of multiple images in which the given element resides. The signal processor also receives precision metadata specifying an estimated precision of each of the settings of the given element for each image in the sequence. Based on the settings information and the precision metadata, the signal processor generates a setting value for the given element. If the setting value produced for the given element is relatively stable, and thus likely a better representation of a setting for the given element than a current setting of the given element, the signal processor utilizes the generated setting value instead of the current setting for encoding purposes.

22 Claims, 16 Drawing Sheets

(56) References Cited

U.S. PATENT DOCUMENTS

| | | | |
|---|---|---|---|
| 6,327,381 B1* | 12/2001 | Rogina | G06T 15/10 382/154 |
| 6,678,330 B1 | 1/2004 | Kondo et al. | |
| 2002/0005857 A1 | 1/2002 | Kasahara et al. | |
| 2003/0043911 A1 | 3/2003 | Guevorkian | |
| 2003/0128759 A1 | 7/2003 | Prakash | |
| 2004/0233990 A1 | 11/2004 | Sekiguchi | |
| 2006/0126741 A1 | 6/2006 | Saito et al. | |
| 2006/0239361 A1 | 10/2006 | Kazuhisa et al. | |
| 2007/0098086 A1 | 5/2007 | Bhaskaran | |
| 2008/0063070 A1 | 3/2008 | Schwartz | |
| 2008/0144716 A1 | 6/2008 | De Haan | |
| 2008/0285867 A1* | 11/2008 | Kajiwara | H04N 1/64 382/233 |
| 2009/0003449 A1 | 1/2009 | Sekiguchi | |
| 2009/0087016 A1 | 4/2009 | Berestov | |
| 2010/0034296 A1 | 2/2010 | Cunha et al. | |
| 2011/0158309 A1 | 6/2011 | Bekiares | |
| 2011/0229028 A1 | 9/2011 | Nagai | |
| 2011/0249745 A1 | 10/2011 | Chen | |
| 2012/0114039 A1 | 5/2012 | Wang | |
| 2012/0206657 A1 | 8/2012 | Bratt | |
| 2014/0078320 A1 | 3/2014 | Hong | |
| 2014/0333971 A1 | 11/2014 | Macciola et al. | |

FOREIGN PATENT DOCUMENTS

| | | |
|---|---|---|
| EP | 0878776 A1 | 11/1998 |
| EP | 1100260 A1 | 5/2001 |
| EP | 1351508 A2 | 10/2003 |
| JP | 2000-348018 A | 12/2000 |
| JP | 2001-126061 A | 5/2001 |
| JP | 2006-310934 A | 11/2006 |
| JP | 2010-287917 A | 12/2010 |
| JP | 2011-199394 A | 3/2011 |
| WO | 9739572 A1 | 10/1997 |

OTHER PUBLICATIONS

Gomila, Cristina et al., "SEI Message for Film Grain Encoding", Proposal, May 23-27, 2003, Total pp. 14, Thomson Inc., Geneva.
International Search Report from corresponding PCT application No. PCT/IB2012/056689, dated Mar. 25, 2013, Total pp. 4.
Office Action, CN 201280067842.8, dated Jan. 26, 2018, pp. 8.

* cited by examiner

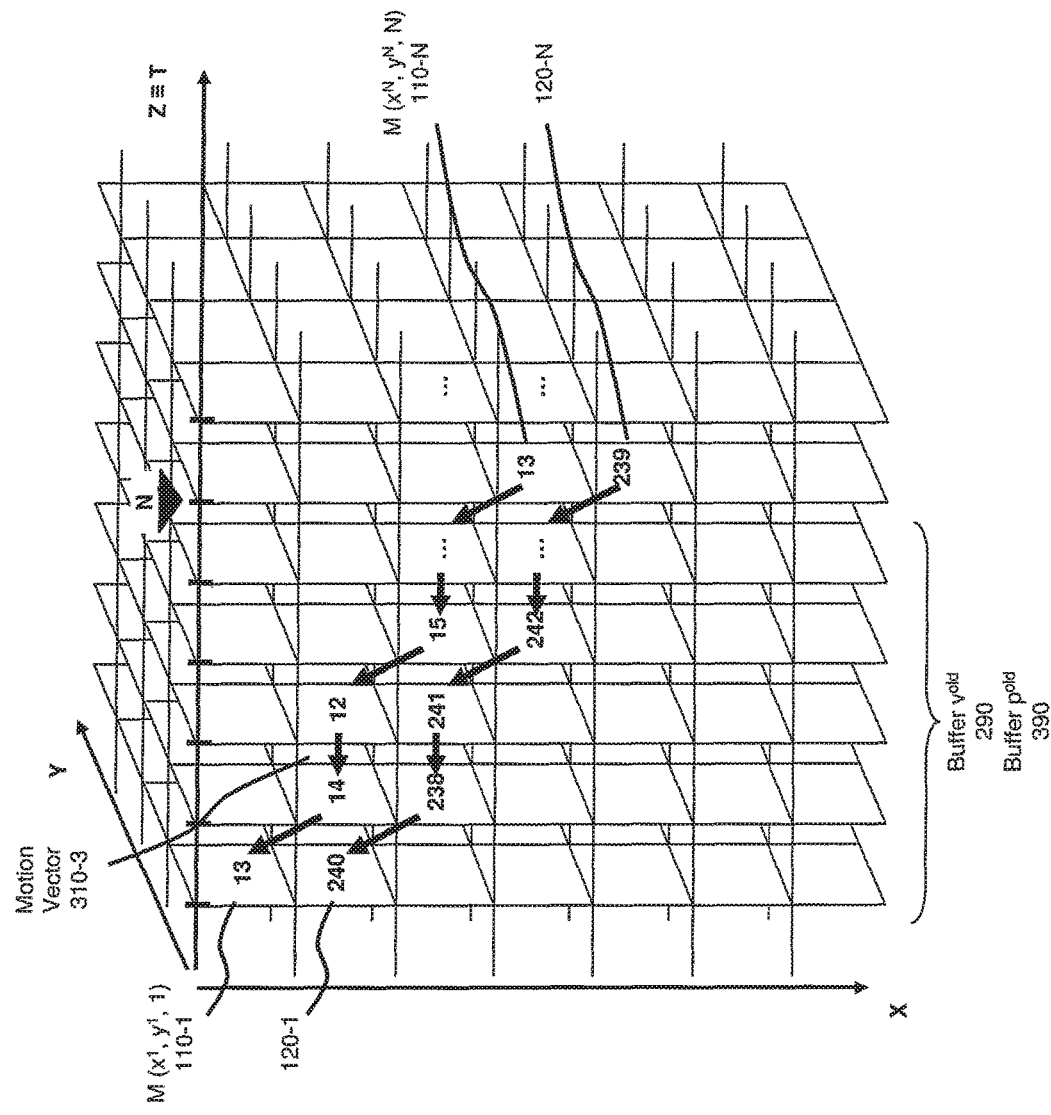

Figure 7A

- Illustrative sequence for a specific value in position (x, y) at T = 1
- The position of the value in the plane may change from image to image, as specified by motion vectors
- In this non-limiting example, $v^{new}$ has the same resolution as M, a = b = 1, precisions are not influenced by motion vector metadata and $v^{new}$ never differs from $v^{old}$ above the threshold that would reset $p^{old}$ to 0
- Initialization: before starting, the contents of buffers $p^{old}$ and $v^{old}$ are set to 0

Sample values | Buffer values

Image at T = 1

$p_1^{new} = 0.1$
$M_{x,y,1} = 150$
$v_{x,y,1}^{new} = M_{x,y,1} = 150$ $v_{x,y,1} = \left(\dfrac{p_1^{new}}{p_1^{new} + p_{x,y,1}^{old}}\right) v_{x,y,1}^{new} + \left(\dfrac{p_{x,y,1}^{old}}{p_1^{new} + p_{x,y,1}^{old}}\right) \cdot v_{x,y,1}^{old} =$ $= 1 \cdot 150 + 0 \cdot 0 = 150$ $v_{x^1,y^1,2}^{old} = v_{x,y,1} = 150$
$p_{x^1,y^1,2}^{old} = p_{x,y,1}^{old} + p_1^{new} = p_1^{new} = 0.1$ Motion vector specifies that position (x,y) at T=1 becomes position (x¹,y¹) at T=2

Image at T = 2

$p_2^{new} = 0.1$
$M_{x^1,y^1,2} = 152$
$v_{x^1,y^1,2}^{new} = M_{x^1,y^1,2} = 152$ $v_{x^1,y^1,2} = \left(\dfrac{p_2^{new}}{p_2^{new} + p_{x^1,y^1,2}^{old}}\right) \cdot v_{x^1,y^1,2}^{new} + \left(\dfrac{p_{x^1,y^1,2}^{old}}{p_1^{new} + p_2^{new}}\right) \cdot 150 =$ $= \dfrac{0.1}{0.2} \cdot 152 + \dfrac{0.1}{0.2} \cdot 150 = 151$ $= \left(\dfrac{p_1^{new}}{p_1^{new} + p_2^{new}}\right) \cdot 152 + \left(\dfrac{p_2^{new}}{p_1^{new} + p_2^{new}}\right) \cdot 150 = 151$ $v_{x^2,y^2,3}^{old} = v_{x^1,y^1,2} = 151$
$p_{x^2,y^2,3}^{old} = p_{x^1,y^1,2}^{old} + p_2^{new} = p_1^{new} + p_2^{new} = 0.2$

Figure 7B – CONTINUED FROM 7A

| Sample values | Buffer values |
|---|---|

Image at T = 3

$p_3^{new} = 0.2$
$M_{x^2, y^2, 3} = 149$
$v_{x^2, y^2, 3}^{new} = M_{x^2, y^2, 3} = 149$ $v_{x^2, y^2, 3} = \left( \frac{p_3^{new}}{p_3^{new} + p_{x^2, y^2, 3}^{old}} \right) \cdot v_{x^2, y^2, 3}^{new} + \left( \frac{p_{x^2, y^2, 3}^{old}}{p_3^{new} + p_{x^2, y^2, 3}^{old}} \right) \cdot v_{x^2, y^2, 3}^{old} =$ $= \left( \frac{p_3^{new}}{p_1^{new} + p_2^{new} + p_3^{new}} \right) \cdot v_{x^2, y^2, 3}^{new} +$ $\left[ \left( \frac{p_2^{new}}{p_1^{new} + p_2^{new}} \right) \cdot v_{x^1, y^1, 2}^{new} + \left( \frac{p_1^{new}}{p_1^{new} + p_2^{new}} \right) \cdot v_{x,y,1}^{new} \right] =$ $= \left( \frac{p_3^{new}}{p_1^{new} + p_2^{new} + p_3^{new}} \right) \cdot v_{x^2, y^2, 3}^{new} + \left( \frac{p_2^{new}}{p_1^{new} + p_2^{new} + p_3^{new}} \right) \cdot v_{x^1, y^1, 2}^{new} +$ $+ \left( \frac{p_1^{new}}{p_1^{new} + p_2^{new} + p_3^{new}} \right) \cdot v_{x,y,1}^{new} = 150$ $v_{x^2, y^2, 3}^{old} = v_{x^2, y^2, 3} = 150$ $p_{x^2, y^2, 3}^{old} = p_{x^2, y^2, 3}^{old} + p_3^{new} = p_1^{new} + p_2^{new} + p_3^{new} = 0.4$

Image at T = 4

$p_3^{new} = 0.05$
$M_{x^3, y^3, 4} = 143$
$v_{x^3, y^3, 4}^{new} = M_{x^3, y^3, 4} = 143$ $v_{x^3, y^3, 4} = \left( \frac{p_4^{new}}{p_4^{new} + p_{x^3, y^3, 4}^{old}} \right) \cdot v_{x^3, y^3, 4}^{new} + \left( \frac{p_{x^3, y^3, 4}^{old}}{p_4^{new} + p_{x^3, y^3, 4}^{old}} \right) \cdot v_{x^3, y^3, 4}^{old} =$ $= \frac{0.05}{0.45} \cdot 143 + \frac{0.4}{0.45} \cdot 150 = 149$ $v_{x^4, y^4, 5}^{old} = v_{x^3, y^3, 4} = 149$ $p_{x^4, y^4, 5}^{old} = p_{x^3, y^3, 4}^{old} + p_4^{new} = p_1^{new} + p_2^{new} + p_3^{new} + p_4^{new} = 0.45$

- Illustrative sequence for a specific value, in position (x, y) at T = 1
- The position of the value in the plane may change from image to image, as specified by motion vectors
- In this non-limiting example, $v^{new}$ has the same resolution as M, a = b = 1, precisions are not influenced by motion vector metadata and $v^{new}$ never differs from $v^{old}$ above the threshold that would reset $p^{old}$ to 0
- Initialization: before starting, the contents of buffers $p^{old}$ and $v^{old}$ are set to 0

SIGNAL ANALYSIS AND GENERATION OF TRANSIENT INFORMATION

RELATED APPLICATIONS

This application is a divisional application of earlier filed U.S. patent application Ser. No. 13/352,944 entitled "SIGNAL ANALYSIS AND GENERATION OF TRANSIENT INFORMATION," filed on Jan. 18, 2012, the entire teachings of which are incorporated herein by this reference.

U.S. patent application Ser. No. 13/352,944 is related to and claims the benefit of earlier filed U.S. Provisional Patent Application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION," filed on Nov. 23, 2011, the entire teachings of which are incorporated herein by this reference.

U.S. patent application Ser. No. 13/352,944 is related to U.S. patent application Ser. No. 13/303,554 entitled "UPSAMPLING AND DOWNSAMPLING OF MOTION MAPS AND OTHER AUXILIARY MAPS IN A TIERED SIGNAL QUALITY HIERARCHY," filed on Nov. 23, 2011, the entire teachings of which are incorporated herein by this reference.

U.S. patent application Ser. No. 13/352,944 is also related to U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference.

U.S. patent application Ser. No. 13/352,944 is related to U.S. patent application Ser. No. 13/188,201 entitled "TIERED SIGNAL DECODING AND SIGNAL RECONSTRUCTION," filed on Jul. 21, 2011, the entire teachings of which are incorporated herein by this reference.

U.S. patent application Ser. No. 13/352,944 is related to U.S. patent application Ser. No. 13/188,207 entitled "SIGNAL PROCESSING AND TIERED SIGNAL ENCODING," filed on Jul. 21, 2011, the entire teachings of which are incorporated herein by this reference.

U.S. patent application Ser. No. 13/352,944 is related to U.S. patent application Ser. No. 13/188,220 entitled "UPSAMPLING IN A TIERED SIGNAL QUALITY HIERARCHY," filed on Jul. 21, 2011, the entire teachings of which are incorporated herein by this reference.

U.S. patent application Ser. No. 13/352,944 is related to U.S. patent application Ser. No. 13/188,226 entitled "SIGNAL PROCESSING AND INHERITANCE IN A TIERED SIGNAL QUALITY HIERARCHY," filed on Jul. 21, 2011, the entire teachings of which are incorporated herein by this reference.

U.S. patent application Ser. No. 13/352,944 is related to U.S. patent application Ser. No. 13/188,237 entitled "TRANSMISSION OF RECONSTRUCTION DATA IN A TIERED SIGNAL HIERARCHY," filed on Jul. 21, 2011, the entire teachings of which are incorporated herein by this reference.

BACKGROUND

It happens very often that a digitized signal features several subsequent samples of the same underlying information (which by way of non-limiting examples might be a 2D image, a 3D volumetric image, or even a plane of elements featuring more than three dimensions), creating a multi-dimensional signal (e.g., by way of non-limiting examples a 3D signal representing a sequence of subsequent 2D images, or a 4D signal representing a sequence of 3D/volumetric images, etc.) where for one of its dimensions T (e.g., by way of non-limiting example, the time dimension in time-based signals) we can assume some degree of signal stability over several subsequent samples. Non-limiting real-life examples would be subsequent slices in a Computer Tomography scan, subsequent volumetric images in a MRI scan, subsequent frames in motion pictures, etc.

Due to the nature of real-life sensors and of transmission channels, it is very likely that different samples of a same underlying information will feature different characteristics. For instance, a specific sample might feature slightly different values of a same underlying information than previous and/or subsequent samples due to motion blur that wasn't present in other samples, or to slightly different radiation intensity (or light conditions) at the time of sampling, or to thermal noise in the sensor, or to transmission errors in a channel, etc. The end result of similar effects is a higher statistical variability of the signal elements along the dimension T with stability hypothesis than it would be necessary or desirable.

The variability of element settings that should otherwise be identical from one frame to the next generates high amounts of detailed information (e.g., unnecessary intensity/color variations, plane elements of the wrong color, etc.) that are hard to distinguish from "real" and necessary details in the signal, and that can complicate further signal processing (e.g., motion estimation, content identification, etc.).

BRIEF DESCRIPTION

The ability to separate stable/relevant information ("core signal") from transient/unnecessary information ("transient layer") can be useful. For example, separation of satble versus transiet infomation according to embodiments herein allows one to improve the intrinsic adherence of the digitized signal to reality (also facilitating further processing). In addition, separation of stable versus transient information enables better compression of the signal, since the amount of information entropy of transient information (which is typically unpredictable from neighboring samples) tends to be higher than that of stable information (which albeit very detailed can typically be at least in part predicted from neighboring samples).

Embodiments herein deviate with respect to conventional systems and methods. For example, embodiments herein include providing new and unique methods to separate transient information in a signal ("transient information" or "transient layer") from stable information ("core signal").

More specifically, a Stable-Transient Separator as discussed herein, sometimes referred to herein as STS, is a universal method that can be applied to any multidimensional signal in which a stability hypothesis is applicable for at least one dimension such as dimension T (i.e., settings of the signal can be assumed to be relatively stable along said dimension T). In one embodiment, a STS or signal processor as discussed herein enables separation of transient information from a core signal, while at the same time preserving in the core signal all of the details that constitute real/relevant information. STS according to one embodiment also allows extraction of characteristics (e.g., spectral distributions of noise, etc.) of the transient layer, so that it is possible, if necessary, to reconstruct a transient layer with similar characteristics (not necessarily identical) as the original transient layer.

There are one or more advantages associated with identifying and/or removing unnecessary transient information (e.g., noise, film grain, highly variable details, etc.) from a signal. For example, identifying and removing the transient components from settings can help to reduce the information entropy of element settings from one image to the next or even within a same image. Reducing the information entropy reduces an amount of data that is needed in order to encode a rendition of the signal. Additionally, identifying and removing the transient/noise components from settings can make it is possible to encode a more accurate and higher quality rendition of the signal.

For simplicity, and for the sake of describing the invention, embodiments illustrated herein refer to 3D time-based signals, and in other particular instances, to sequences of 2D planes of settings (e.g., sequences of 2D images in a suitable color space). However, the concepts as discussed herein can be applied to any other types of multi-dimensional signal, not necessarily time-based, in which at least one dimension T (e.g., time) is suitable for a stability hypothesis, i.e., settings of the signal can be assumed to be relatively stable along said dimension(s).

For example, embodiments herein can include compensating for motion and with the exception of variations above a threshold, the signal maintains similar values for several subsequent samples along a dimension T. In essence, the signal can be assumed to have a certain degree of predictability along dimension T. For the dimensions where it is not valid the hypothesis that the signal is relatively stable, we assume that we are not willing to lose detailed information, even if it's very local and/or non-correlated with other portions of the signal along those dimensions.

In particular, we will refer to each 2D plane in the sequence as "sample of the signal in the position t", where t is a suitable position in dimension T.

One embodiment herein includes a signal processor configured to produce a moving average for each of the elements of a sample of the signal in position t, with the moving average calculated as a weighted average of measures of corresponding elements in neighboring samples of the signal.

In one embodiment, the moving average is weighed with precision-based weights, taking into account the statistical properties of each planar sample of the signal. For example, the statistical properties of transient information are not assumed constant for each sample of the signal, so measures coming from different samples are weighed differently in the moving average.

In a further more specific embodiment, higher weight values are assigned to samples deemed to be of higher precision. If the measure of settings of an element (i.e., its corresponding settings) in position T is different from its corresponding moving average above a threshold amount, the moving average setting for the element is reset so information indicating a degree to which one or more element settings for each element in a sequence is stable or not.

In accordance with further embodiments, a signal processor leverages a map of moving averages associated with one or more elements in order to produce a new rendition of the sample of the signal ("core signal") without encoding the transient information that was previously included in the original signal. Transient information (e.g., obtained by subtracting the "core signal" rendition of the sample from the original sample) can be analyzed and stored separately. In certain cases, the transient information can be made available for further use if necessary.

In yet another embodiment, a signal processor analyzes attributes of the transient information identified in a signal. The signal processor can capture an essence of the transient information as being of a particular type of mathematical distribution. If desired, the signal can be encoded without the transient information. A decoder reproducing a rendition of the signal can decode the data to produce a rendition of the signal without the identified transient information. As mentioned, in one embodiment, the signal processor can add the transient information (in accordance with the attributes identified by the signal processor) back in the signal in accordance with the particular type of mathematical distribution associated with the identified transient information.

An original signal (including the transient information) and corresponding reproduced version of the signal (including transient information generated based on the particular type of mathematical distribution) may not be identical because the transient information is not added back into the signal in the exact same location and/or with the same settings as the transient information present in the original signal. However, the essence of the original signal and the reproduced signal will appear to be quite similar.

In another embodiment, the map of moving averages can be used in a feedback loop in order to update the precision information associated with each sample of the signal.

In yet further embodiments, accurate auxiliary maps (e.g., motion maps/prediction maps providing a motion vector/prediction vector for each element of each leveraged in order to relax the stability hypothesis assumed for dimension T. In such embodiment, the map of moving averages is motion-compensated before being leveraged to produce a new rendition of the sample of the signal without transient information.

In accordance with further more specific embodiments, values associated with motion vectors (e.g., by way of non-limiting examples, the radius of each motion vector, or the confidence level/precision associated with each motion vector) are leveraged in order to influence the map of moving averages. For example, a sequence of images (e.g., video frames) can include one or more elements that represent a moving object. Motion maps include information indicating movement of the one or more objects in the sequence of images. The settings of elements in the images for a given object may be the same even though the x-y position of the elements representing the object moves from one image to the next. So-called motion maps (e.g., motion vector information) can be used to identify and track the movement of the object from one image to the next.

Embodiments herein include monitoring and analyzing elements representing the moving object from one plane (e.g., video frame, etc.) to the next in a sequence. In one embodiment, the motion map information specifies the movements of the elements. Setting information (e.g., display setting information in a suitable color space, such as YUV, RGB, HSV, etc.) associated with the images indicates settings assigned to the moving elements. For each element, the signal processor can be configured to determine whether changes in the settings for a given moving element amount to transient information (e.g., acquisition noise, film grain, highly variable details, etc.) or whether they occur due to a change in a scene.

In accordance with yet a further embodiment, a signal processor receives settings information. The settings information specifies a setting of a given element for each image (e.g., plane, frame, etc.) in a sequence of multiple images in which the given element resides. The signal processor also receives precision metadata specifying statistical properties (e.g., an estimated precision, etc.) of each of the settings of the given element for each image in the sequence. Based on the settings information and the precision metadata, the signal processor generates a setting value for the given element. The setting value can indicate a degree to which settings for the given element are stable over one or more of the images.

In one example embodiment, if the setting value or moving average produced for the given element is relatively stable, and thus likely a better representation of a setting for the given element than a current setting of the given element, the signal processor utilizes for each image the generated setting value (e.g., setting of the element less the transient information, or "generated stable value") over a sequence of multiple images instead of the current setting of the given element as a basis to encode a setting of the given element for one or more images of the sequence of images.

The estimated precision information associated with a respective setting of the given element can be a statistical measurement indicating a probability or degree to which a respective setting of the multiple settings may include a significant component of transient information (e.g., noise, film grain, etc.). In one embodiment, such estimated precision information for the elements of a given image is calculated based at least in part on the generated stable values of the previous image.

In accordance with a further embodiment, the signal processor assigns a corresponding precision value to the stable setting value (e.g., moving average) for the given element for the sequence of images based at least in part on a sum of the estimated precisions of each of the settings of the given element for each image in the sequence.

In a more specific embodiment, when generating the stable setting value to the given element, the signal processor applies weight factors to each of the settings; the weight factors vary based at least in part on the estimated precisions of the settings for the given element. The signal processor sums the weighted settings to produce the setting value for the given element. Thus, embodiments herein can include generating the setting value for the given element based on different weightings of the settings in the sequence.

In accordance with further embodiments, the signal processor can normalize the weight factors for a window of settings or samples associated with a given element being analyzed. For example, in accordance with another embodiment, the signal processor normalizes the weight factors prior to applying the weight factors to the settings.

In yet another embodiment, as mentioned, the stable setting value for the given element over the sequence of images is a moving average value calculated based on weightings of the settings of the given element for each image in the sequence. As mentioned, a magnitude of the weightings applied to the settings vary depending at least in part on the estimated precision of each of the settings.

The stable setting value for the given element can be updated for each additional sample image in which the given element resides. For example, in one embodiment, the signal processor can receive a next setting value and corresponding precision value assigned to the given element for a next contiguous image along dimension T following a previously analyzed sequence of images. The signal processor updates the setting value assigned to the given element based on a combination of the assigned setting value and a weighting of the next setting of the given element for the next contiguous image.

The setting value for the given element may change drastically from one image to the next. This can occur due to several reasons, such as (in the case of video images) a change of lighting conditions, a change in the nature of the entity to which the element belongs, or a change in the scenery captured by the images. In such an embodiment, the moving average or setting value can be reset or alternatively updated based on attributes of another image following the initial sequence of images on which the stable setting value for the given element is based.

For example, in accordance with a first sample case, assume that the signal processor receives a next setting value and corresponding precision value assigned to the given element for a subsequent image following the sequence. The signal processor generates a difference value indicating a difference between the previously generated setting value (for a window of one or more images) and the next setting value for the given element (in a next image following the window of images). Embodiments herein can include generating a threshold value. The signal processor compares the difference value to the threshold value. Responsive to detecting that the difference value is less than the threshold value, the signal processor updates the setting value assigned to the given element based at least in part on a combination of the generated setting value and a weighting of the next setting of the given element.

Alternatively, in accordance with a second example case, assume the signal processor receives a next setting value and corresponding precision value assigned to the given element for a next contiguous image following the sequence of images. As mentioned, the signal processor can generate a difference value indicating a difference between the generated setting value (for the window images) and the next setting value for the given element (in a next image following the window of images). The signal processor compares the difference value to a threshold value. In this example, responsive to detecting that the difference value is greater than the threshold value, the signal processor resets the buffered setting value and updates the setting value for the given element to be equal to the next setting value. Thus, when the difference is above a generated threshold value, the signal processor disregards the previous settings.

Note that the given element can represent an entity (e.g., object) residing at different position coordinates of each image in the sequence. The signal processor can be configured to utilize motion vector information associated with the sequence of images to identify the different position coordinates of the given element in each image of the sequence. The motion vector information indicates movement of the entity in the sequence of images.

In addition to or as an alternative to generating the weight factors depending on magnitudes of the precision of element settings, embodiments herein can include generating a magnitude of the weightings applied to the settings based at least in part on precision metadata associated with the motion vector information. The precision metadata associated with the motion vectors can indicate a degree to which the motion vector is accurate.

As previously mentioned, the stable setting value or moving average value generated for each image in a sequence of one or more images can be used to encode a signal as opposed to using the original settings for the given element in each of the images. This potentially reduces an amount of data needed to encode the signal, often at the same time improving the perceived quality of the signal. In other words, embodiments herein can include characterizing transient information (e.g., noise, film grain, highly variable details, etc.) and encoding a signal with a reduced amount of transient information.

Embodiments herein can further include analyzing variations in the settings of the images to identify attributes of transient components in the settings and encode a signal with reduced transient components. Upon subsequent rendering of the sequence of multiple images during playback, a decoder and/or playback device can be configured to inject the identified transient components (e.g., noise) back into a rendition of the sequence of multiple images during playback so that it appears similar to the original signal.

In accordance with further embodiments, precision metadata can be generated based on an analysis of a group of elements or an entire image as opposed to merely analyzing settings of a single element from one image to the next. For example, in one embodiment, a processing resource can generate the precision metadata for the given element and a respective image in the sequence based on an overall analysis of a grouping of multiple elemental settings in the respective image compared to corresponding settings in at least one previous image with respect to the respective image.

These and other embodiment variations are discussed in more detail below.

As mentioned above, note that embodiments herein may be implemented in software or hardware, or may be implemented using a combination of software and hardware, and can include a configuration of one or more computerized devices, routers, network, workstations, handheld or laptop computers, set-top boxes, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM, or DVD-ROM), floppy or hard disk or any other medium capable of storing computer readable instructions such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting any of the signal processing operations as discussed herein.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce motion vectors. However, it should be noted that embodiments herein are not limited to use in such applications and that the techniques discussed herein are well suited for other applications as well.

Additionally, note that although each of the different features, techniques, intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

In accordance with yet further embodiments, embodiments herein include a method of generating per each element m of a multidimensional signal, a stable value v, based on a stability hypothesis along one of the dimensions T of the signal, the method comprising: selecting or receiving a plane element m of the signal; based at least in part on the coordinates of element m, selecting or receiving k−1 additional plane elements of the signal (with k≥2), each of the k elements characterized by a different coordinate along the dimension T with a stability hypothesis; and based at least in part on the settings of each of the k elements, generating a stable value v for plane element m.

In yet a further embodiment, the k elements are located one subsequent to the other along the dimension T with stability hypothesis.

In yet further embodiments, the contribution of each of the k elements to the stable value v depends at least in part on statistical parameters associated with the stable value. The method further comprises: selecting or receiving a plane element m of the signal; based at least in part on the coordinates of element m, selecting or receiving k−1 additional plane elements from the signal, each of the k elements characterized by a different coordinate along the dimension T with stability hypothesis; based at least in part on the settings of each of the k elements and on statistical parameters associated to each element, generating a stable value v for plane element m.

In yet further embodiments, the statistical parameters associated to each element include information on the precision of each element. (e.g., by way of non-limiting example, precision can be calculated as the inverse of the estimated variance of settings).

In yet further embodiments, the selection and the contribution of each of the k elements to the stable value v depend at least in part on the settings of element m. The method further comprises: selecting a plane element m of the signal; based at least in part on the coordinates of element m and on the settings of m, selecting k−1 additional plane elements from the signal, each of the k elements characterized by a different coordinate along the dimension T with stability hypothesis; based at least in part on the settings of each of the k elements and on statistical parameters associated to each element, generating a stable value v for plane element m.

In yet another embodiment, the stable value associated to each element m can be generated by weighing the settings of each of the k elements based on the statistical parameters associated to each of the k elements.

In accordance with another embodiment, the weights associated to elements whose settings differ from the settings of element m beyond a threshold are set to zero. A setting of the threshold can depend at least in part on estimated statistical properties of measures of the signal for elements with the same coordinate along dimension T as element m.

In yet another embodiment, each of the k−1 elements selected to generate the stable value v for element m is identified by leveraging suitable motion vectors, the method further comprises: selecting a plane element m of the signal; based at least in part on the coordinates of element m, on the settings of m and on a motion vector associated to element m, selecting at least one additional plane element i of the signal, characterized by a preceding or subsequent coordinate along the dimension T with stability hypothesis; up until k elements have been selected (with k≥2), based at least in part on the coordinates of the last selected element, on the settings of the last selected element and on a motion vector associated to it, selecting at least one additional plane element j of the signal, characterized by a preceding or subsequent coordinate along the dimension T with elements and on statistical parameters associated to each element, generating a stable value v for plane element m.

In yet another embodiment, the contribution of each selected element to the stable value depends on meta-information associated to motion vectors (e.g., by way of non-limiting example on precision information associated to motion vectors), the method comprising: selecting a plane element m of the signal; based at least in part on the coordinates of element m and on a motion vector associated to element m, selecting at least one additional plane element i of the signal, characterized by a preceding or subsequent coordinate along the dimension T with stability hypothesis; up until k elements have been selected (with k≥2), based at least in part on the coordinates of the last selected element and on a motion vector associated to it, selecting at least one additional plane element j of the signal, characterized by a preceding or subsequent coordinate along the dimension T with stability hypothesis; based at least in part on the settings of each of the identified elements, on statistical parameters associated to each element and on statistical parameters associated to the motion vectors used to identify the elements, generating a stable value v for plane element m.

In yet another embodiment, the stable value associated to each element m is generated based at least in part on settings contained in a buffer $v^{old}$ associated to the coordinate of element m along dimension T, the method further comprises: selecting a plane M of the signal for a given coordinate t along dimension T; selecting within M a plane element m of the signal; identifying buffer $V^{old}$ corresponding to plane M of the signal; based at least in part on the coordinates of element m, selecting an element $v^{old}$ in buffer $V^{old}$; based at least in part on the settings of m, on the settings of $v^{old}$, and on suitable weight parameters associated to settings of m and $v^{old}$, generating a stable value v for plane element m.

In yet further embodiments, the weight parameters associated to m and $v^{old}$ are normalized, so that the sum of the weights is equal to 1.

In yet another embodiment, the weight parameters depend on statistical parameters such as the estimated precisions of m and $v^{old}$. In a non-limiting embodiment, previsions are calculated as the inverse of the variance.

In accordance with further embodiments, the weight parameter associated to $v^{old}$ is set to zero whenever settings of m and $v^{old}$ differ beyond a threshold, the threshold depending at least in part on estimated statistical properties of m and $v^{old}$.

In another embodiment, the buffer value $P^{old}$ contains a plane of elements $p^{old}$, each element $p^{old}$ of buffer $P^{old}$ corresponding to an element $v^{old}$ of buffer $V^{old}$, the method comprising: selecting a plane M of the signal for a given coordinate t along dimension T; selecting within M a plane element m of the signal; identifying buffer $V^{old}$ corresponding to plane M of the signal; based at least in part on the coordinates of element m, selecting an element $v^{old}$ in buffer $V^{old}$; identifying buffer $P^{old}$ corresponding to plane $V^{old}$; based at least in part on the coordinates of element $v^{old}$, selecting an element $v^{old}$ in buffer $P^{old}$ associated to element $v^{old}$; based at least in part on the settings of m, on the settings of $v^{old}$, and on suitable weight parameters associated to settings of m and $v^{old}$, generating a stable value v for plane element m, the weight parameter associated to $v^{old}$ depending at least in part on settings of element $p^{old}$.

In another embodiment, the weight parameters associated to settings of m depends at least in part on statistical properties $p^{new}$ of the plane of differences between signal measures (i.e., settings of signal elements) and corresponding generated stable values for a coordinate along dimension T neighboring the coordinate along dimension T of element m.

In accordance with further embodiments, settings of buffer $V^{old}$ for a given coordinate t along dimension T are generated by adjusting, based at least in part on the contents of an auxiliary map associated with the signal, the plane of stable settings V generated for the plane M of elements of the signal with coordinate T=t.

In another embodiment, settings of buffer $P^{old}$ for a given coordinate t along dimension T are generated by adjusting, based at least in part on the contents of an auxiliary map associated with the signal, a plane of settings generated based at least in part on the settings of buffer $P^{old}$ for a neighboring coordinate (e.g., t−1 or t+1) of coordinate t along dimension T.

In accordance with yet further embodiments, the plane MM (motion map) motion map, the method further comprises: generating settings of buffer $V^{old}$ for a given coordinate t along dimension T by motion compensating, based at least in part on motion vectors contained in a motion map MM associated with the plane of the signal at coordinate T=t, the plane of stable settings V generated for the plane M of elements of the signal with coordinate T=t.

In yet further embodiments, the plane MM with coordinate T=t of the auxiliary map associated with the signal is a motion map, the method further comprises: generating settings of buffer $P^{old}$ for a given coordinate t along dimension T by motion compensating, based at least in part on motion vectors contained in a motion map MM associated with the plane of the signal at coordinate T=t, a plane of settings generated based at least in part on the settings of buffer $P^{old}$ for a neighboring coordinate (e.g., t−1 or t+1) of coordinate t along dimension T; if meta-information on statistical properties of motion vectors are available (e.g., by way of non-limiting example, information on the precision of each motion vector), adjusting settings of buffer $P^{old}$ based on the statistical properties of the corresponding motion vectors.

In another embodiment, the stable values are generated with a resolution (i.e., numbers of elements along the various coordinates) that is different from the resolution of the signal, the method further comprises: selecting a plane M of the signal for a given coordinate t along dimension T; identifying buffer $V^{new}$ corresponding to plane M of the signal, buffer $V^{new}$ featuring a resolution (i.e., number of elements along the various coordinates) that is different from the resolution of plane M; generating settings for buffer $V^{new}$ based at least in part on settings of plane M; selecting within $V^{new}$ a plane element $v^{new}$; identifying buffer $V^{old}$ corresponding to plane M of the signal, buffer $V^{old}$ featuring the same resolution as buffer $V^{new}$; based at least in part on the coordinates of element $v^{new}$, selecting an element $v^{old}$ in buffer $V^{old}$; identifying buffer $P^{old}$ corresponding to plane $V^{old}$, buffer $P^{old}$ featuring the same resolution as buffer $V^{new}$ and $V^{old}$; based at least in part on the coordinates of element $v^{old}$, selecting an element $p^{old}$ in buffer $P^{old}$ associated to element $v^{old}$; based at least in part on the settings of $v^{new}$, on the settings of $v^{old}$, and on suitable weight parameters associated to settings of $v^{new}$ and $v^{old}$, generating a stable value v corresponding to plane element $v^{new}$, the weight parameter associated to $v^{old}$ depending at least in part on settings of element $p^{old}$.

In yet further embodiments, based at least in part on the difference between stable settings v and the corresponding settings of elements of the signal, information on transient component of the signal is generated, the method further comprises: selecting a plane M of the signal for a given coordinate t along dimension T; generating for each element m of plane M a stable value v; based at least in part on differences between settings of plane M and their corresponding stable values, generating information TC on transient component of plane M.

In another embodiment, the information TC (transient component) includes parameters indicating the spectral distribution of the differences between settings of plane M and their corresponding stable values.

In yet another embodiment, the information TC includes reconstruction data to reconstruct a tiered hierarchy (i.e., progressively higher levels of quality) of renditions of differences between settings of plane M and their corresponding stable values, according to a method of tiered signal decoding and signal reconstruction as incorporated herein by reference.

In another embodiment, planes of the signal along dimension T are progressively available over time, as opposed to being all immediately available for processing.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 3A, 3B, and 3C are example diagrams illustrating movement and sampling of plane elements according to embodiments herein.

FIGS. 7A and 7B are example diagrams illustrating generation of processing plane element settings and corresponding precision information according to embodiments herein.

DETAILED DESCRIPTION OF EMBODIMENTS

Figure 1:
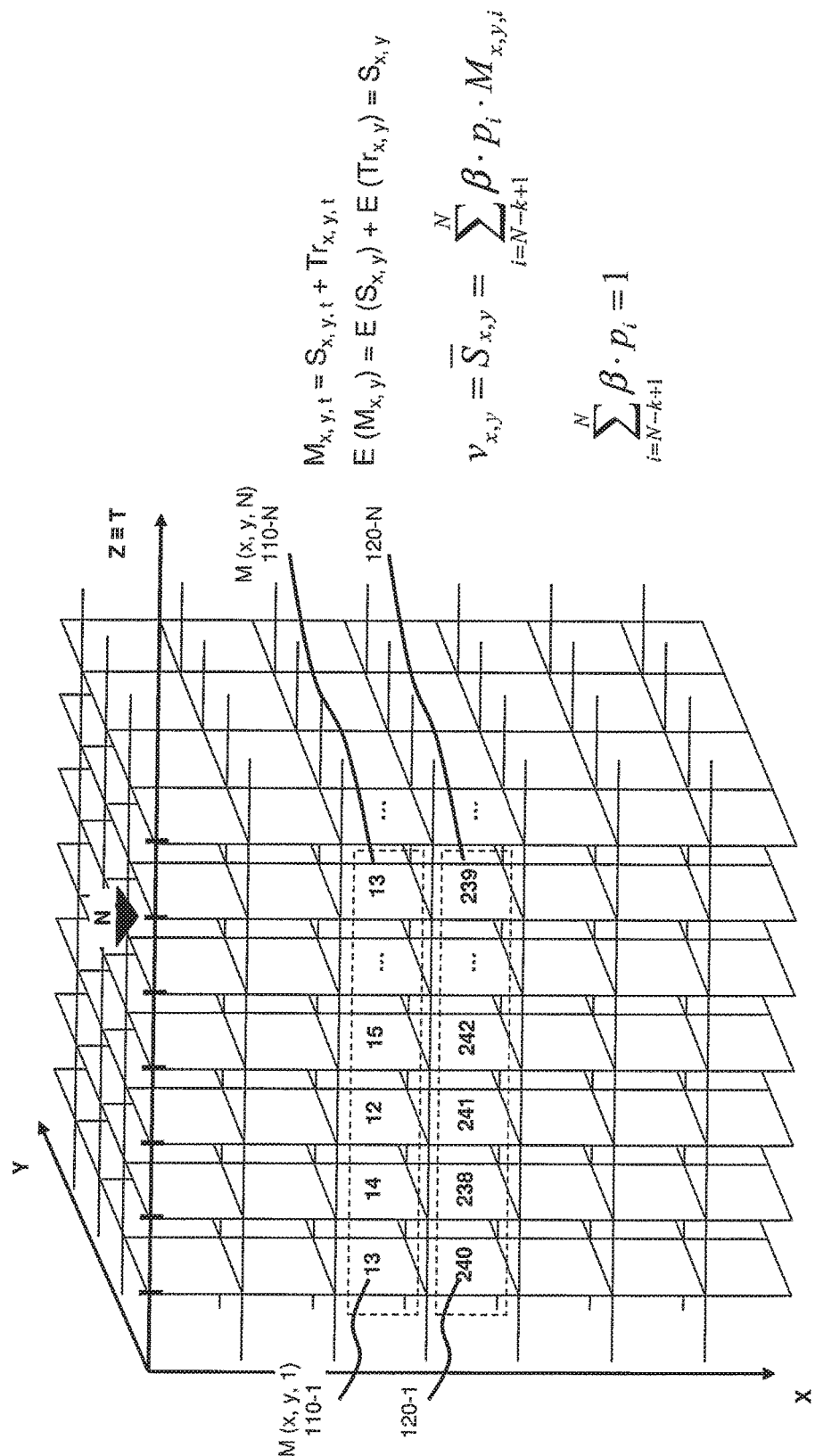
FIG. 1 is an example diagram illustrating variations in settings of plane elements in a sequence of planes according to embodiments herein.

In accordance with one example embodiment, a signal processor receives settings information. The settings information specifies a setting of a given element for each image (e.g., plane, frame, etc.) in a sequence of multiple images in which the given element resides. The signal processor also receives statistical information such as precision metadata specifying an estimated precision of each of the settings of the given element for each image in the sequence. Based on the settings information and the precision metadata, the signal processor generates a setting value for the given element.

The setting value generated for an element under test (e.g., given element) can be which a setting for the given element is stable over one or more of the images. In one example embodiment, if the setting value or moving average produced for the given element is relatively stable, and thus likely a better representation of a setting for the given element than a current setting of the given element, a signal processor encoding the signal utilizes the generated stable setting value over a sequence of multiple images instead of the current setting of the given element as a basis to encode a setting of the given element for one or more images of the sequence of images.

Naming Convention Used in this Document
(in the non-limiting example of a three-dimensional signal, where for one of the dimensions—i.e., dimension T, assumed to be time—is applied a stability hypothesis)
Naming

| Convention | Description |
|---|---|
| $M_{X,Y,t}$ | Measures the signal at the coordinates (X, Y, t), or equivalently measures of the element at coordinates (X, Y) for the image at T = t. Measures are the original settings for each sampled element of the signal, and include both stable components and transient components. |
| $V_{x,y,t}^{new}$ | Settings of the resampled image at T = t. The buffer $v^{new}$ may have along dimensions X and Y either the same resolution as that of the sample M, or a different one (either higher or lower); when the resolutions are the same, the settings of $v^{new}$ for a given set of coordinates coincide with the settings of M in the same coordinates. |
| $p_t^{new}$ | Precision value settings of the image at T = t. Different sets of coordinates (x, y) may feature a different precision $p^{new}$, although in the non-limited embodiments described herein $p^{new}$ is the same for all of the coordinates (x, y) of a given image at T = t. |

-continued

| Convention | Description |
|---|---|
| $V_{x,y,t}$ | Calculated stable settings for a set of coordinates (x, y) of the image at T = t. Stable settings estimate the "real value" of a given element (x, y, t) if we didn't have transient components, hence the letter "v" for "value". |
| $V_{x,y,t}^{old}$ | Buffered estimated stable settings for a set of coordinates (x, y) of the image at T = t before accounting for the sample at time T = t; in a non-limiting embodiment, the plane of stable settings $V^{old}$ at T = t is calculated by motion compensation of the calculated stable settings V at T = t − 1. |
| $p_{x,y,t}^{old}$ | Cumulated precision of the buffered estimated stable settings $V^{old}$ for a set of coordinates (x, y) of the image at T = t. |
| $(x^1, y^1, t + 1)$ | Set of coordinates linked to set of coordinates (x, y, t) by means of a motion vector; in other words, (x1, y1) is the estimated new location at T = t + 1 of the same stable value that at T = t was in location (x, y). |
| a, b | Weight parameters used to calculate $p^{old}$ at a given T = t + 1, based on $p^{old}$ and $p^{new}$ at T = t; if parameter a is <1 then it means that older samples have progressively a lower importance than more recent samples; if a = b = 1, the importance of each sample in order to determine the stable value at a given time T = t + 1 depends only on its precision and not on how recent or far back in time it was with respect to T = t + 1. |
| E(.) | Expected value (i.e., statistical mean value) of a value/measure/setting. Talking about Expected value is especially relevant for entities of stochastic nature: for instance measure M, which is made in part of stochastic components (i.e., transient components). |
| $\overline{S}_{x,y}$ | Estimate of S in position (x, y), calculated taking into accounts samples of the signal at different coordinates along dimension T. |
| β | Normalization parameter, defined so as to make $$\sum_{i=N-k+1}^{N} \beta \cdot p_i = 1.$$ |
| $\sigma^2(\bullet)$ | Statistical variance of a value/measure/setting. |

FIG. 1 is an example diagram illustrating a 3D signal where for one of the dimensions Z we assumed a stability hypothesis according to embodiments herein. In this example embodiment, the dimension Z is renamed as dimension T to highlight that for that dimension we want to separate transient information from stable information.

For each plane element of the signal, identified by coordinates (x, y, t), we have available a "measure" M(x, y, t). The plane of all measures M(x, y, t) for a given T=t is also referred to herein as "sample of the signal in position T=t" (e.g., in a video signal it would correspond to a given image in a sequence of images along the temporal dimension).

Given the stability hypothesis, we can assume that M(x, y, t) is made of the sum of a stable component S(x, y, t) and a transient component Tr(x, y, t). The transient component is assumed to be stochastic with an expected value E(Tr) equal to zero, so the expected value E(M) of the measure is in fact the stable component:

$$M_{x,y,t} = S_{x,y,t} + Tr_{x,y,t}$$

$$E(M) = E(S) + E(Tr) = E(S) = S$$

In one embodiment, in essence, S is the "real" value of the plane element without a transient component (e.g., without acquisition noise and/or other highly variable components). If we have multiple samples/measures along dimension T, we can estimate such real value. If we label "v" as an estimate of the real value of the element, we can calculate v with a suitable weighted average of the last k samples, as follows:

$$v_{x,y} = \overline{S}_{x,y} = \sum_{i=N-k+1}^{N} \beta \cdot p_i \cdot M_{x,y,i}$$

$$\sum_{i=N-k+1}^{N} \beta \cdot p_i = 1$$

$$\sigma^2(v_{x,y}) \leq \sigma^2(M_{x,y,i})$$

The weight parameters $p_i$ can be pre-set values of a moving average or in more sophisticated embodiments they can depend on estimates of statistical properties of the sample data at T=i (e.g., a non-limiting example calculates precision $p_i$ as the inverse of the variance of the sample at T=i, so that measures coming from samples with high variance/low precision have a lower weight in the weighted average with respect to measures coming from samples with low variance/high precision).

By way of a non-limiting example, the fundamental hypothesis, as mentioned, is that M is stable, i.e., that all of the $M_{x,y,i}$ for a given set of (x, y) (e.g., all the measures 110 in FIG. 1, from 110-1 to 110-k) have the same expected value (although not necessarily the same probability distribution, since the nature of transient components can differ along dimension T). In order to account for this hypothesis, an embodiment makes sure that whenever the measure M at T=i is different from measures at T<i beyond a threshold (either depending on $p_i$—to account for the specific probability distribution of M at T=i—or, in another non-limiting embodiment, absolute), the estimate of the real value, v, will not take into account measures at T<i (either all of them or, in another non-limiting embodiment, just the ones that differ beyond the threshold).

As shown, a given element 110-1 resides in the same (x, y) location of a plane across a sequence of multiple planes and thus does not move. The settings of M for the elements from 110-1 to 110-N are 13, 14, 12, 15, . . . , 13. The settings for the element 110-1 to 110-N are relatively unchanging over time. That is, there may be a minor variation amongst the settings due to noise or to other transient components.

Also, as shown, a given element 120-1 resides in the same (x, y) location of a plane across a sequence of multiple planes. The settings of M for the elements from 120-1 to 120-N are 240, 238, 241, 242, . . . 239. The settings for the element 120-1 to 120-N are relatively unchanging over time. The minor variation amongst the settings can occur due to noise or to other transient components.

Figure 2A:
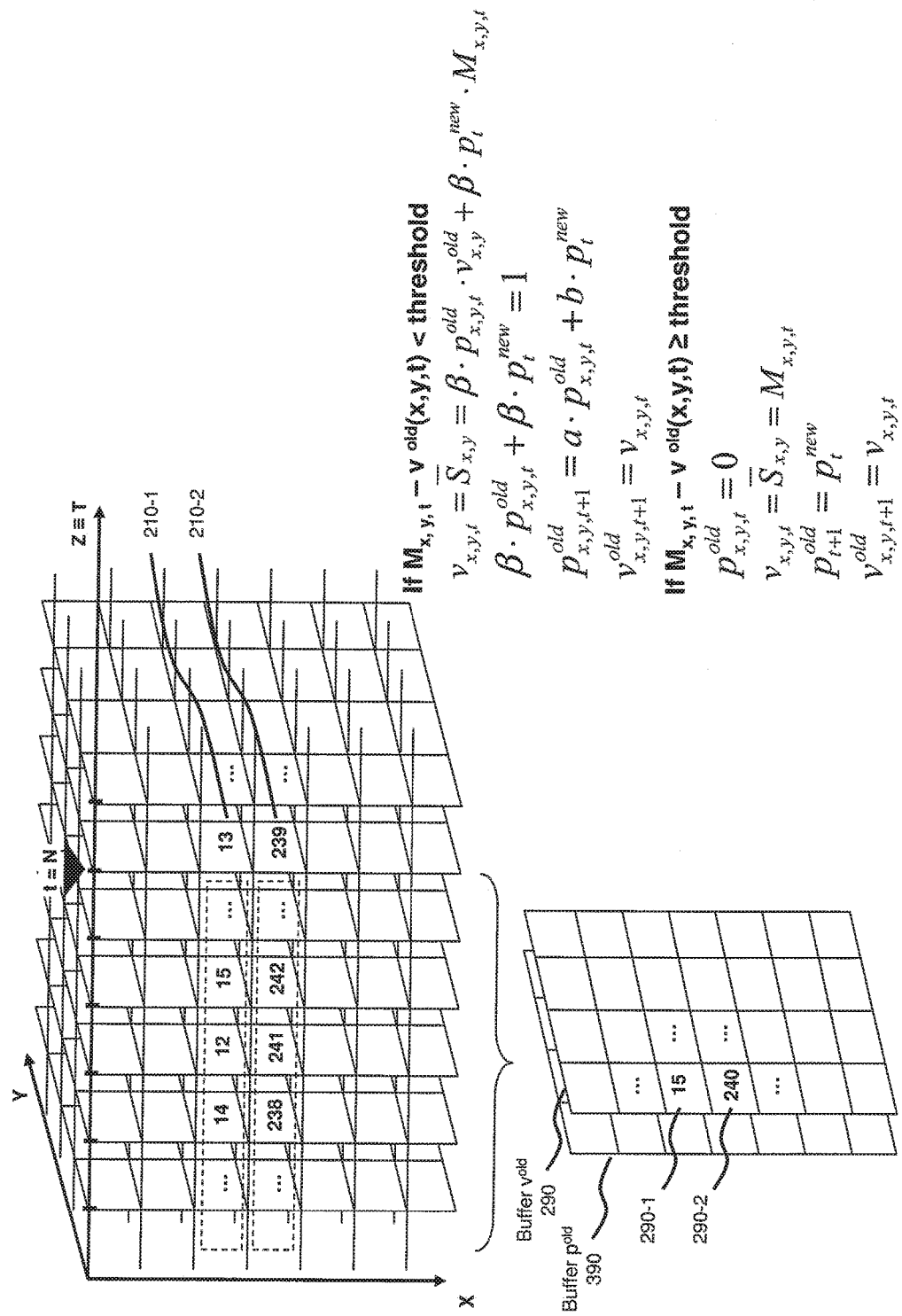
FIGS. 2A and 2B are example diagrams illustrating sampling of plane elements according to embodiments herein.

FIG. 2A is another example diagram illustrating a 3D signal where for one of the dimensions Z (renamed as T) we assumed a stability hypothesis according to embodiments herein.

In this embodiment, the moving average of measures based on precisions which for each coordinate (x, y) can involve a different and non pre-determined amount of measures along dimension T—is made easier and more efficient by the introduction of one or more buffers. At T=t, the buffer $v^{old}$ contains for each coordinate (x, y) the value $v_{x,y}$ estimated for the sample of the signal at T=t−1.

In an embodiment, a buffer $p^{old}$ is also available, containing for each coordinate (x,y) the precision information (e.g., statistical information) of the respective estimate of the setting $v_{x,y}$ at T=t−1, contained in the buffer $v^{old}$.

In one embodiment, the measure M for each respective element (x, y) at a given T=t provides an approximate setting of the element. The corresponding precision information $p^{new}$ includes precision data indicating a degree to which the setting information for a given element may vary with respect to its expected value (i.e., to its stable value).

By way of a non-limiting example, the precision information indicates a degree to which the corresponding setting of the respective element is stable over one or more samples. For example, the precision information can be a value between zero and infinity. A value closer to zero indicates that the setting is not precise or unstable (i.e., the measure M in position x, y can potentially be very different from the "real value" or "stable value" that we should find in position x, y), a value much greater than zero indicates that the setting is precise and stable.

At any T=t, the estimate of stable value $v_{x,y}$ and the new values in the buffers are calculated as follows:

$$v_{x,y,t} = \overline{S}_{x,y} = \beta \cdot p_{x,y,t}^{old} \cdot v_{x,y,t}^{old} + \beta \cdot p_t^{new} \cdot M_{x,y,t} =$$
$$\beta \cdot p_{x,y,t}^{old} \cdot v_{x,y,t}^{old} + \beta \cdot p_t^{new} \cdot v_{x,y}^{new}$$

$$\beta \cdot p_t^{new} + \beta \cdot p_{x,y,t}^{old} = 1$$

$$p_{x,y,t}^{old} = a \cdot p_{x,y,t}^{old} + b \cdot p_t^{new}$$

$$v_{x,y,t+1}^{old} = v_{x,y,t}$$

β, a and b are suitable parameters. In one example embodiment, a=b=1. The settings of the a and b can be adjusted to place more or less weight on new setting of an element versus previously processed old settings of an element. In an example embodiment, $p^{old}$ cannot grow indefinitely, but saturates (i.e., it is clamped) after reaching a threshold.

In order to account for the stability hypothesis, one embodiment herein includes adding the following operation, which "resets" to zero the value of $p^{old}$ in a coordinate (x, y) when the difference between $M_{x,y,t}$ and the value contained in the buffer $v^{old}$ is not consistent with the stability hypothesis:

If $(M_{x,y,t} - v^{old}) \geq$ threshold, then:

$$P_{x,y,t}^{old} = 0$$

$$v_{x,y,t} = \overline{S}_{x,y} = M_{x,y,t}$$

$$p_{x,y,t+1}^{old} = p_t^{new}$$

$$v_{x,y,t+1}^{old} = v_{x,y,t}$$

Other embodiments account for the stability hypothesis by resetting the values of $v^{old}$ and $v^{old}$ in different ways. The threshold can either be a fixed constant or depend on the local statistical properties of the signal (e.g., by way of non-limiting example, on precisions $p^{new}$ and/or $p^{old}$).

Figure 2B:
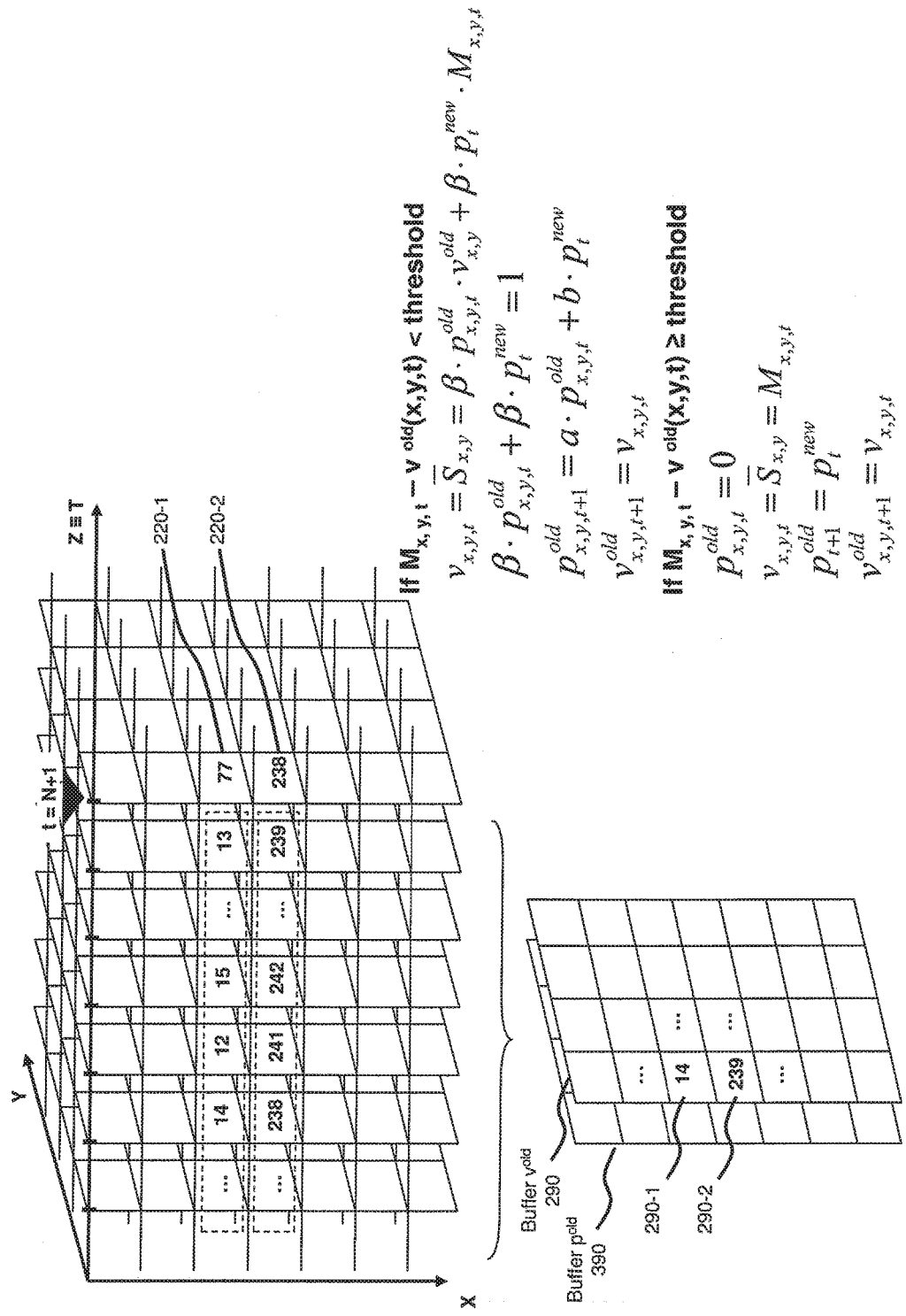

FIG. 2B illustrates the same example embodiment of FIG. 2A at the subsequent sample along dimension T according to embodiments herein. In this case, the measure 220-1 (e.g., M=77) conflicts with the stability hypothesis, being different above a threshold from the value 290-1 (e.g., $v^{old}$=14) contained in the buffer $v^{old}$ 290. In other words, the difference between 77 and 14 is greater than a threshold value (e.g., threshold value=25). As a consequence, $v^{old}$ is set to 0 before estimating value, v, so that the value 290-1 will not influence the estimate v.

On the contrary, measure 220-2 (e.g., M=238) respects the stability hypothesis, being sufficiently similar to value 290-2 (e.g., $v^{old}$=239) contained in the buffer $v^{old}$ 290. For example, the difference between 239 and 238 is less than a threshold value. As a consequence, estimate of stable value v at T=N+1 will be a weighted average of value 290-2 and value 220-2, utilizing as weights the respective normalized precisions of value 290-2 and value 220-2. Estimates v at T=N+1 will be then stored in the buffer 290 so as to become the values $v^{old}$ to be used at T=N+2.

Figure 3B:
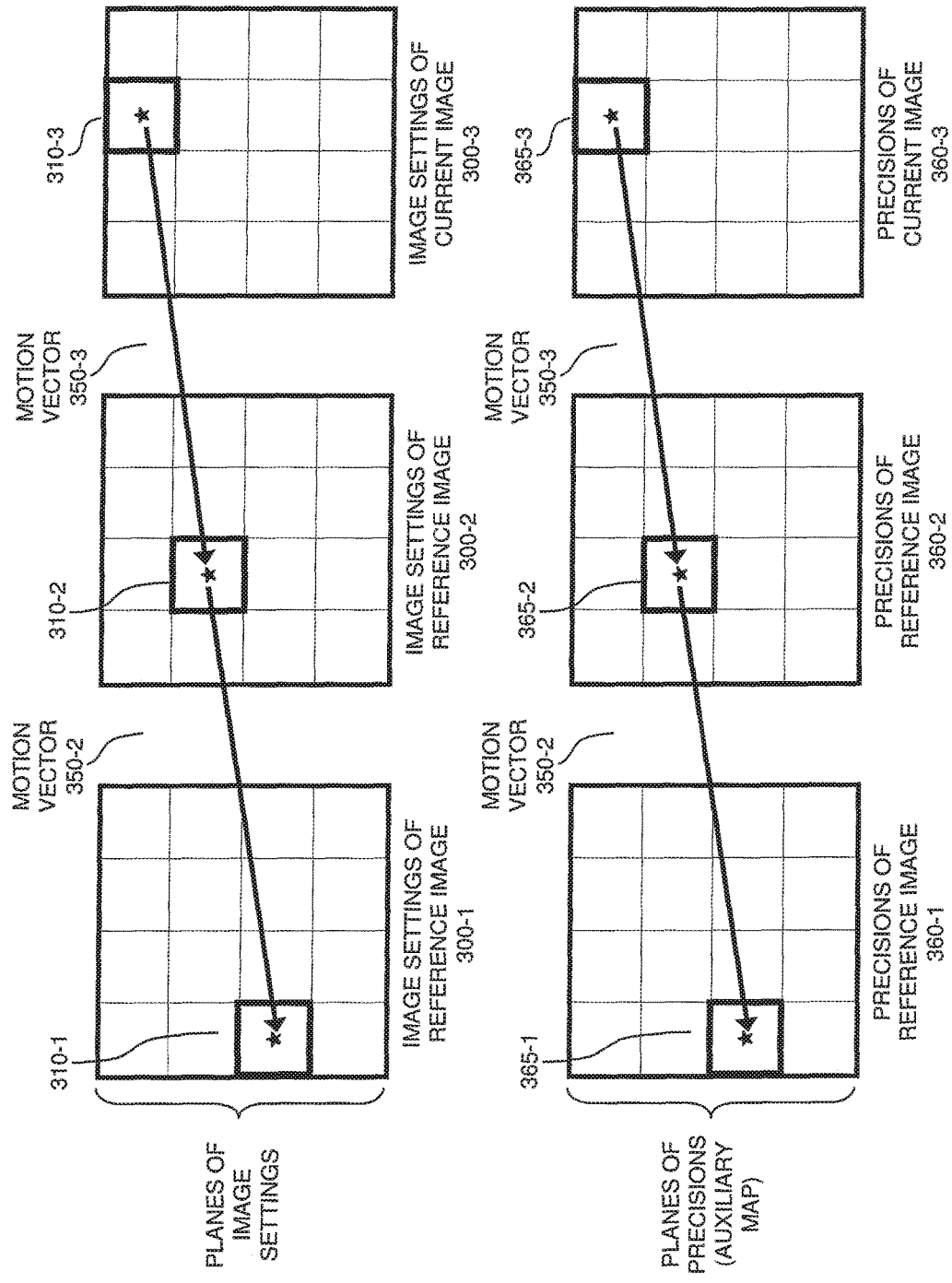

FIG. 3A and FIG. 3B are example diagrams illustrating a 3D signal, where for one of the dimensions Z (renamed as T) we assumed a stability hypothesis, and relaxed the hypothesis that, at different samples T, stable values maintain their exact position along dimensions X and Y according to embodiments herein. This means that the location of each value in a precedent sample along dimension T may be different from the location (x, y) of the measure $M_{x,y,t}$.

However, as illustrated in the figure, the same approach described in FIG. 1, FIG. 2A and FIG. 2B can be adopted, provided that for each sample, t, we have available suitable motion vectors indicating for each coordinate ($x^t$, $y^t$) the respective location ($x^{t-1}$, $y^{t-1}$) of the corresponding element in the sample of the signal at T=t−1. The respective motion vector setting for each element in a plane indicates whether the corresponding object, to which the element pertains, changed its location from one plane to another.

Thus, with motion vectors, it is possible to keep track of the movement of the object from one plane to another.

After compensating for motion, the signal processor calculates stable values as follows:

$$v_{x^N, y^N} = \overline{S}_{x^N, y^N} = \sum_{i=N-k+1}^{N} \beta \cdot p_i \cdot M_{x^i, y^i, i}$$

$$\sum_{i=N-k+1}^{N} \beta \cdot p_i = 1$$

In essence, the measures M to consider for the weighted average are obtained based on motion vectors, so that measure M in a given position ($x^N$, $y^N$) at T=N can be averaged out with the corresponding k−1 values in positions ($x^{N-k+1}$, $y^{N-k+1}$) at T=N−k+1.

It is useful to highlight that in an embodiment, for i<N, precisions information, $p_1$ takes into account both the estimated statistical properties of the signal at T=i and the statistical properties of the motion vectors (e.g., in a non-limiting embodiment the precision of the motion vectors) that connect location ($x^N$, $y^N$) to location ($x^i$, $y^i$). Accordingly, a measure M in location ($x^i$, $y^i$) at a given sample at T=i is weighted in a way that reflects both the statistical properties of the sample at T=i (i.e., less precise samples are weighted with a lower weight) and the certainty that motion vectors accurately identified the right location to include in the weighted average (i.e., less precise locations are weighted with a lower weight).

Thus, according to non-limiting example embodiments herein, the magnitude of the weightings applied to the settings can depend at least in part on precision metadata associated with the motion vector information. In one embodiment, the precision metadata associated with the motion vector indicates a degree of certainty that elements residing at different locations in a plane are related to each other.

In another non-limiting embodiment, instead of directly averaging out all of the k samples each time, the signal processor leverages buffers for the old estimate of v ($v^{old}$) and for the precision $p^{old}$ of such old estimate of v. Buffer $v^{old}$ is obtained by motion compensation of the plane of old estimates of v, while buffer $p^{old}$ is obtained by motion compensation of the sum of the old plane of precisions $p^{old}$ (corrected based on the precisions of the respective motion vectors) with $p^{new}$. The formulas become the following:

$$v_{x^1,y^1,t} = \overline{S}_{x^1,y^1} = \beta \cdot p_{x^1,y^1,t}^{old} \cdot v_{x^1,y^1}^{old} + \beta \cdot p_t^{new} \cdot M_{x^1,y^1,t} = \beta \cdot p_{x^1,y^1,t}^{old} \cdot v_{x^1,y^1}^{old} + \beta \cdot p_t^{new} \cdot v_{x^1,y^1}^{new}$$

$$\beta \cdot p_t^{new} + \beta \cdot p_{x^1,y^1,t}^{old} = 1$$

$$p_{x^2,y^2,t+1}^{old} = \text{Motion-compensation}(\text{Corrected}(p_{x^1,y^1,t}^{old}) + p_t^{new})$$

$$v_{x^2,y^2,t+1}^{old} = \text{Motion-compensation}(v_{x^1,y^1,t})$$

In essence, the new value of the buffers are obtained by also leveraging motion-compensation, so that measure M in a given position $(x^N, y^N)$ at T=N can be averaged out with the corresponding estimated value in position $(x^{N-1}, y^{N-1})$ at T=N−1. Precisions reflect both the statistical properties of the signal and the precision of the motion vectors that are used for the motion compensation.

In order to account for the stability hypothesis, one embodiment herein includes "resetting" to zero the value of $p^{old}$ for a respective element when the difference between $M_{x,y,t}$ and the value contained in the buffer $v^{old}$ is not consistent with the stability hypothesis. In other words, if the value of an element under test is greater than a threshold value from one plane to the next, then the value for the element in the buffer is reset using the new precision and setting information.

FIG. 3B illustrates sample movement of an object and a relationship of coordinates from one plane to the next in a sequence of images. For example, sequence of images includes image 300-1, image 300-2, image 300-3, etc. The motion vector 350-2 indicates that element 310-2 in image 300-2 corresponds to the element 310-1 in image 300-1; the motion vector 350-3 indicates that element 310-3 in image 300-3 corresponds to the element 310-2 in image 300-2; and so on. As mentioned, the sequence of elements 310-1, 310-2, 310-3, etc., at different coordinates in each plane/image can represent a common object in the image. Each element in planes 300 has one or more corresponding settings.

Embodiments herein also include precision metadata for each element. The precision metadata can be conveniently stored in a mirrored manner to track the settings of the elements. For example, precision metadata 365-3 in plane 360-3 indicates a precision setting associated with element 310-3; precision metadata 365-2 in plane 360-2 indicates a precision setting associated with element 310-2; precision metadata 365-1 in plane 360-1 indicates a precision setting associated with element 310-1; and so on.

Figure 3C:
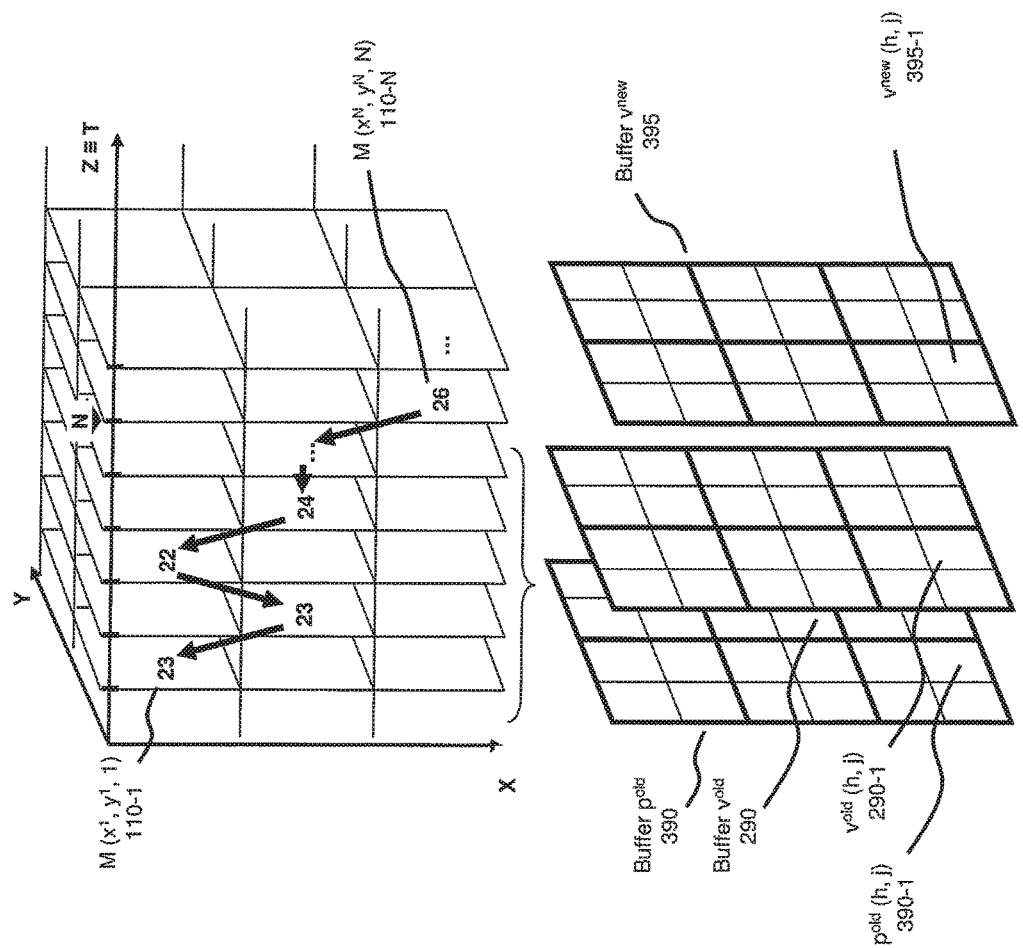

FIG. 3C is an example diagram illustrating an embodiment where the resolution (i.e., the number of elements) of the planes $v^{old}$ and $p^{old}$ is higher than the resolution of the plane of measures M according to embodiments herein. In this non-limiting example the resolution is higher by a factor of 2 along both dimension X and Y, but any other scale factors could be used. Having buffers with higher resolution means that the analysis includes trying to estimate the "real" values, v, at a resolution that is higher than the actual measures that we have available for each sample of the signal. The rationale for doing this is that we assumed stability along dimension T and we have available multiple samples of the signal along dimension T: since the samples are potentially taken in different positions (as specified by the available motion maps/motion vectors), of the stable values. In this non-limiting embodiment, motion vectors specify movements with sub-element resolution, i.e., the motion vectors can specify movements of a fraction of an element (e.g., "one and a half elements up, two elements and three quarters to the right") in a respective plane as opposed to merely indicating that an element in one plane corresponds to an element in another plane.

The embodiment works in a similar way as illustrated for the FIGS. 3A and 3B, with the difference that the plane of values $v^{new}$ at a given T=t no longer coincides with the plane of measures M at T=t, since the plane $v^{new}$ (which is obtained with suitable operations based on the plane of measures M) has the same resolution as the plane $v^{old}$. The estimate of value v in position (h, k) is calculated as follows:

$$v_{h,k,t} = \overline{S}_{h,k} = \beta \cdot p_{h,k,t}^{old} \cdot v_{h,k}^{old} + \beta \cdot p_t^{new} \cdot v_{h,k}^{new}$$

$$\beta \cdot p_t^{new} + \beta \cdot p_{h,k,t}^{old} = 1$$

For the following iteration at T=t+1, the buffers $v^{old}$ and $p^{old}$ are motion compensated leveraging on suitable motion maps. In an example embodiment, such motion maps are directly received at the resolution of the plane v, with element precision. In another embodiment, motion maps are received at the resolution of plane M with sub-element precision, and suitably upsampled to the resolution of plane v (e.g., leveraging on the approaches described in U.S. patent application Ser. No. 13/303,554 entitled "Upsampling and Downsampling of Motion Maps and Other Auxiliary Maps in a Tiered Signal Quality Hierarchy", the entire teachings of which is incorporated herein by this reference).

Figure 4:
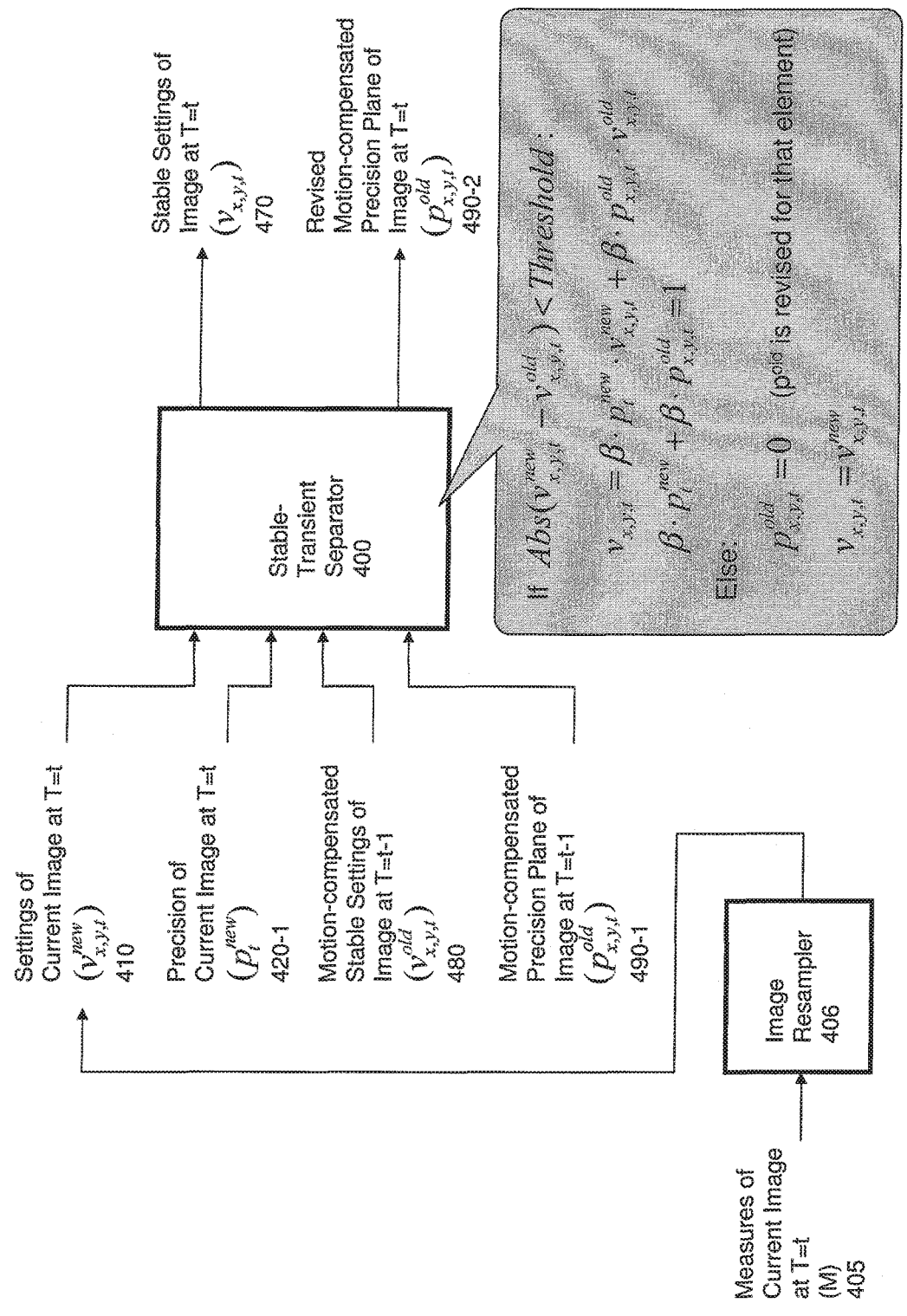
FIG. 4 is an example diagram illustrating processing of plane elements to generate stability information according to embodiments herein.

FIG. 4 is an example diagram of an embodiment of a Stable Transient Separator according to embodiments herein. The image resampler 406 receives measurements 405 of the current image in a sequence. Similar to the approaches described for previous figures, a Stable Transient Separator 400 as discussed herein receives, as input from the image resampler 406, settings $v^{new}$ 410 for each element in the respective plane being sampled, a precision $p^{new}$ 420-1 for each element of the plane (in this embodiment a single value for the whole plane), a first running buffer including a plane of motion-compensated stable settings $v^{old}$ 480 and a second running buffer plane of motion-compensated precision information $p^{old}$ 490-1. The separator 400 produces a plane of stable settings v 470 and updates the values of $p^{old}$ by producing a plane of revised precision information $p^{old}$ 490-2.

As mentioned, for each element in the new or next image plane, the separator 400 compares a running value setting for the element in the buffer to the corresponding new value in the next image. If the difference is less than a threshold value, then the signal processor updates the values in the buffer based on a combination of the previous values for p and v for the given element as well as the new settings for p and v for the given element. If the difference is greater than a threshold value, then the signal processor updates the values in the buffer based on the settings p and v for the given element in the next image.

Figure 5:
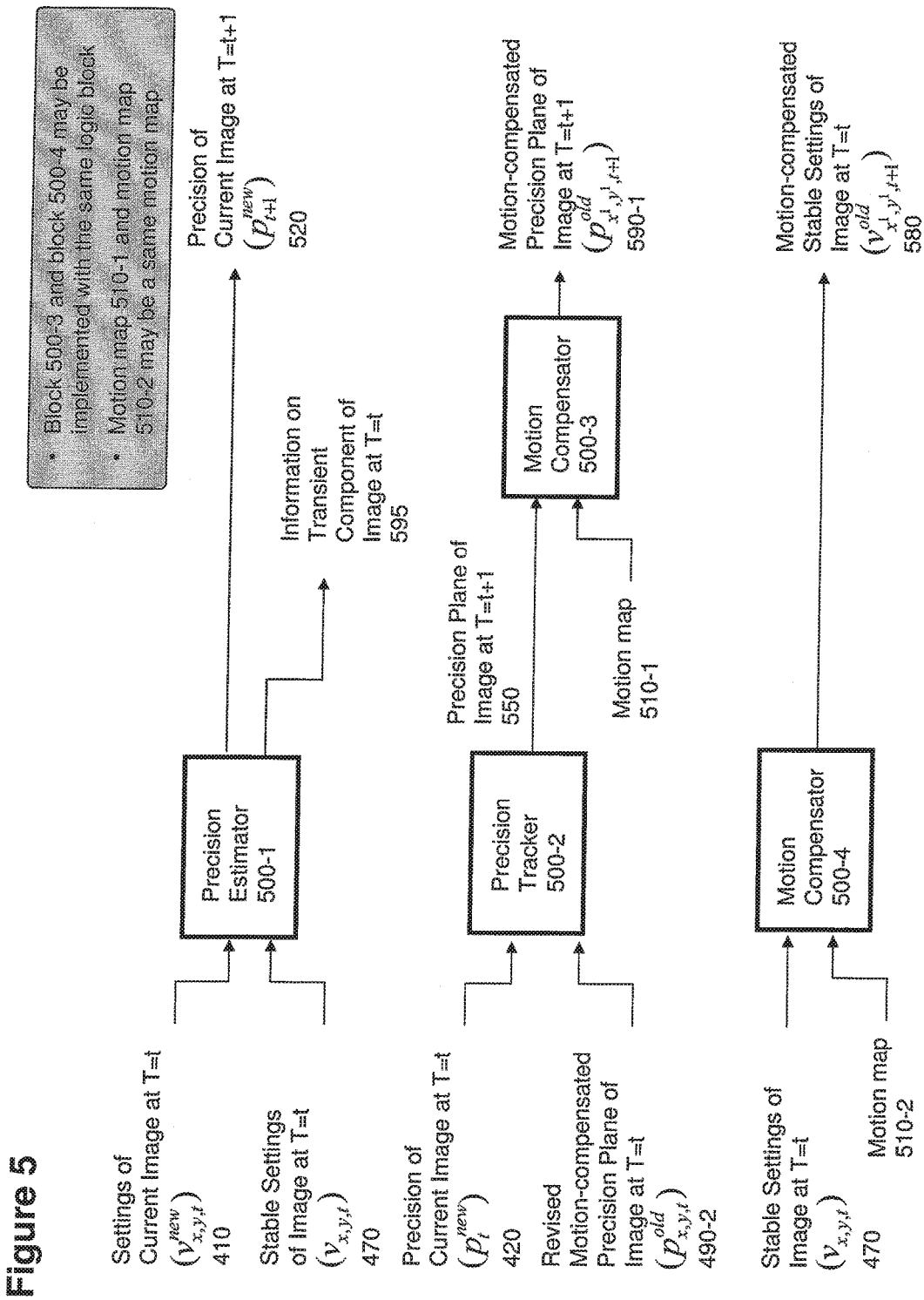
FIG. 5 is an example diagram illustrating processing of plane elements to generate stability information according to embodiments herein.

FIG. 5 is an example diagram of embodiments to update the buffers of precisions ($p^{new}$ and $p^{old}$) and of values ($v^{old}$) according to embodiments herein.

In one embodiment, the plane $p^{old}$ 590-1 is calculated by both motion-compensating plane 550 using the coordinates of motion vectors in motion map 510-1 and adjusting the precision of each element based on meta-data of motion vectors (e.g., precisions of motion vector) also contained in motion map 510-1.

For example, as shown, embodiments herein can include a precision estimator 500-1, precision tracker 500-2, a motion compensator 500-3, and a motion compensator 500-4.

The precision estimator 500-1 receives setting sequence of frames a current image 410 and stable settings of image 470 and produces information on transient components 595 as well as precision of current image 520.

The precision tracker 500-2 receives precision of current image 420 and revised motion-compensated precision plane of image 490-2 and produces the precision plane of image 550.

The motion compensator 500-3 receives precision plane of image 550 and motion map 510-1 and produces motion compensated precision plane of image 590-1.

The motion compensator 500-4 receives stable settings of image 470 and motion map 510-2 to produce motion compensated stable settings of image 580.

Figure 6:
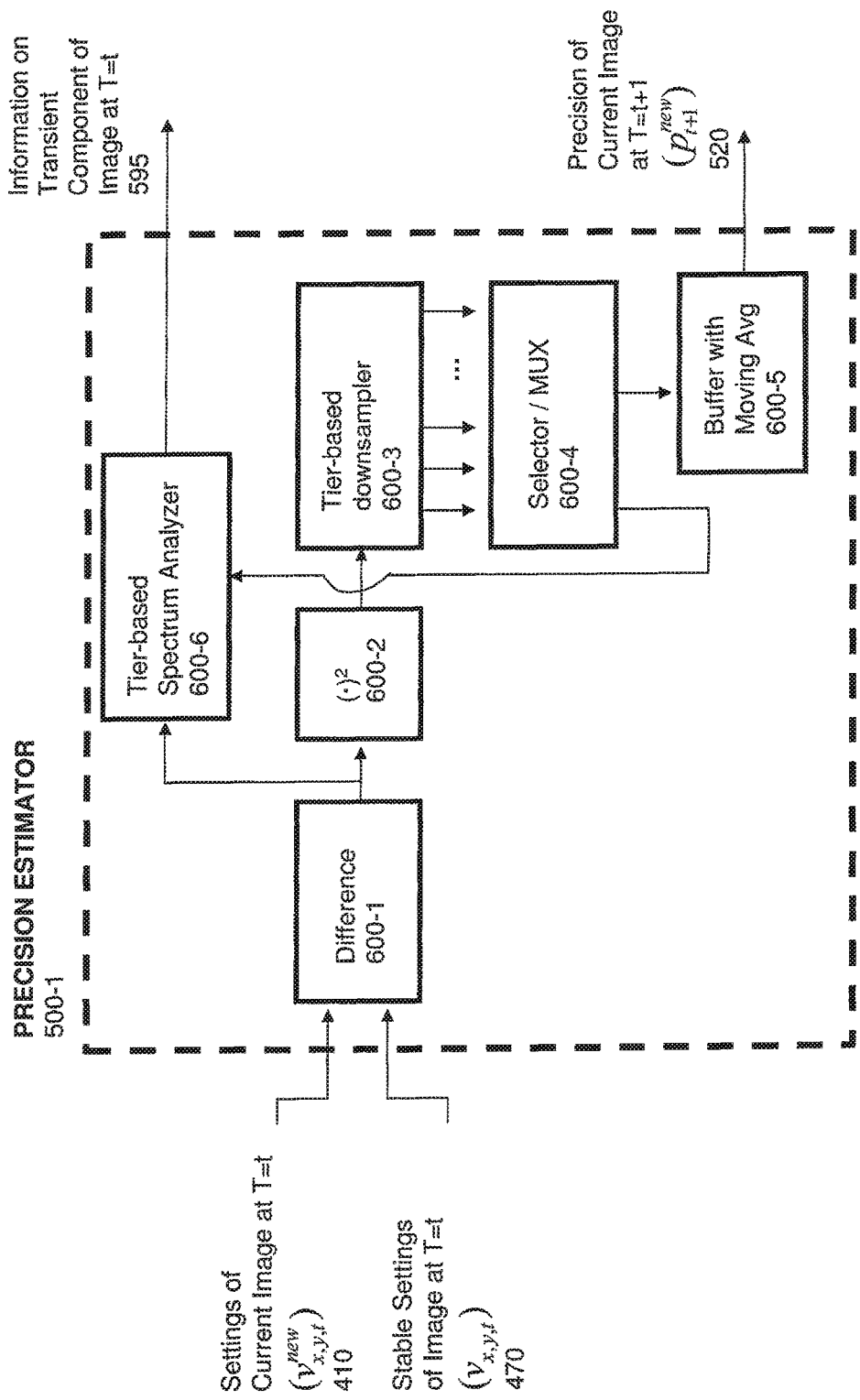
FIG. 6 is an example diagram illustrating generation of precision information according to embodiments herein.

FIG. 6 is an example diagram of an embodiment of Precision Estimator 500-1 according to embodiments herein.

In one embodiment, in addition to calculating the precision $p^{new}$ to be used for the next iteration (i.e., T=t+1) of Stable Transient Separation, the Precision Estimator 500-1 also calculates Information 595 on the Transient Component of the signal at T=t. Such information—typically characterized by a lower information entropy than the original transient component itself—allows a signal processor (e.g., a decoder) to reconstruct a rendition of the original transient component at T=t that—if summed to a rendition of the stable component of the signal at T=t—reconstructs a rendition of the overall signal very similar (although not necessarily identical) to the original signal. The high degree of similarity is due to the fact that the stable component is the one that carries the more important information, and thus must be accurately reconstructed. On the other hand, the transient component (by nature less predictable and more "randomic", very different from sample to sample) is characterized by a higher information entropy (precisely because of its unpredictability), but it carries "less important" information.

In many applications it may be satisfactory to just reconstruct a similar rendition of the transient component (e.g., by way of non-limiting example, a transient component featuring the same spectral distribution) rather than encoding a precise representation of the transient component.

As shown, the precision estimator 500-1 includes module 600-1, module 600-2, module 600-3, module 600-4, module 600-5, and module 600-6.

Module 600-1 produces difference values based on settings 410 and stable settings 470. Module 600-1 outputs the difference values to module 600-6 and module 600-2.

Module 600-2 squares the received difference value and outputs the square of the difference value to module 600-3. Module 600-3 downsamples the squared difference values at multiple tiers. Module 600-4 is a multiplexer or selector circuit that outputs a tier of the downsampled value to module 600-6. Module 600-6 outputs information 595.

Module 600-5 stores a moving average and outputs a value indicating a precision of a current image.

In accordance with further embodiments, the precision estimator 500-1 generates precision metadata 520 based on an analysis of a group of elements or an entire image as opposed to merely analyzing settings of a single element from one image to the next. For example, in one embodiment, the precision estimator 500-1 generates the precision metadata for the elements based on an overall analysis of a grouping of multiple elemental settings in the respective image compared to corresponding settings in at least one previous image with respect to the respective image.

FIGS. 7A and 7B illustrate an example sequence of operations to perform weighted sampling according to embodiments herein.

Assume in this example that the stable-transient separator 400 progressively refines the estimate for a specific value, in position (x, y) at T=1 according to embodiments herein. As mentioned, the position of the value in the plane may change from image to image, as specified by motion vectors contained in a suitable motion map.

In this non-limiting example below, for images between T=1 and T=4, a=b=1 and the settings, $v^{new}$, for the element under test never differs from $v^{old}$ above the threshold that would reset $p^{old}$ to a value of 0.

As previously discussed, in accordance with one embodiment, a signal processor such as a stable-transient separator 400 receives settings information for each of multiple groupings of elements (e.g., frame, planes, etc.) in a sequence. The settings information specifies a setting of a given element for each image (e.g., plane, frame, etc.) in a sequence of multiple images in which the given element resides. For example, the setting of an element (e.g., given element under test) in a first image at T=1 is 150; the setting of the element in a second image at T=2 is 152; the setting of the element in a third image at T=3 is 149; the setting of the element in a fourth image at T=4 is 143; and so on. As previously mentioned, the signal processor can use motion vector information to determine movement of a given element from one plane to the next.

The settings, v, can represent any type of data such as display settings in which to display a respective element during playback. Controlling settings of multiple elements in a field during playback over time produces a moving picture for viewing.

By way of a non-limiting example, the signal processor (e.g., stable-transient separator 400) also receives precision metadata specifying an estimated precision of each of the settings of the given element for each image in the sequence. Assume in this example that the precision metadata information associated with the element in the first image at T=1 is 0.2; the precision metadata setting of the element in the second image at T=2 is 0.05; the precision metadata setting of the element in a third image at T=3 is 149; the setting of an element in a fourth image at T=4 is 143; and so on.

Based on the settings information and the corresponding precision metadata information, the signal processor generates a buffered setting value (e.g., $v^{old}$) and corresponding buffered precision setting value (e.g. $p^{old}$) for the given element under test. In one embodiment, the buffered setting value $v^{old}$ is a moving weighted average value that changes over time. The buffered precision setting value $p^{old}$ indicates a degree to which a setting for the given element is stable over one or more of the images.

For the image at T=1, the settings of the buffered setting value $V^{old}$ and the buffered precision setting value $v^{old}$ are initially set to zero. The current precision setting value for the element under test at T=1 is 0.1; the current setting of the element under test in the image at T=1 is 150. In accordance with the equations in FIG. 7A for the image at T=1, the signal processor sets the settings of the buffered setting value $v^{old}$ to 150 and the buffered precision setting value $v^{old}$ to 0.1.

For the image at T=2, the next image in the sequence, the settings of the buffered setting value $V^{old}$ and the buffered precision setting value $v^{old}$ from processing the previous image are respectively 150 and 0.1 as discussed above. The current precision setting value for the element under test in the image at T=2 is 0.1; the current setting of the element under test in the image at T=2 is 152. The signal processor compares the value of the difference of 2 (e.g., 152-150) is not greater than a threshold value (e.g., threshold value=20), the buffered values for the element are not reset. Instead, in accordance with the calculations in FIG. 7A for the element under test at in the image at T=2, the signal processor sets the settings of the buffered setting value $v^{old}$ to 151 and the buffered precision setting value $p^{old}$ to 0.2.

In this instance, to produce the buffered setting value $v^{old}$ for the element under test at T=2, as shown, the signal processor applies different weights (e.g., normalized weights) to the settings 152 and 150 based on the corresponding precision metadata settings. To produce the buffered precision setting value $p^{old}$ for the image at T=2, the signal processor adds the precision setting values for each of the element settings in the sequence. In this example, the signal processor produces the buffered precision setting value by adding $p_1^{new}=0.1$ and $p_2^{new}=0.1$ to produce the value of 0.2.

For the image at T=3, the settings of the buffered setting value $V^{old}$ and the buffered precision setting value $p^{old}$ from processing the previous image are respectively 151 and 0.2. The current precision setting value for the element under test in the image at T=3 is 0.2; the current setting of the element under test in the image at T=3 is 149.

In general, the setting of the element under test does not change much over this sequence of images. The signal processor compares the buffered value 151 to the new value 149. Since the absolute value of the difference of 2 (e.g., 151-149) is not greater than a threshold value (e.g., threshold value=20), the buffered values are not reset.

Instead, in accordance with the calculations in FIG. 7B for the element under test at in the image at T=3, the signal processor sets the settings of the buffered setting value $v^{old}$ to 150 and the buffered precision setting value $p^{old}$ to 0.4.

In this instance, to produce the buffered setting value $v^{old}$ for the element under test at T=3, as shown, the signal processor applies different weights (e.g., normalized weights) to the settings 149, 152, and 150 based on the corresponding precision metadata settings 0.2, 0.1, and 0.1. To produce the buffered precision setting value $v^{old}$ for the image at T=3, the signal processor adds the precision setting values for each of the element settings in the sequence. In this example, the signal processor produces the buffered precision setting value for the element by adding $p_1^{new}=0.1$, $p_2^{new}=0.1$, and $p_3^{new}=0.2$.

For the image at T=4, the settings of the buffered setting value $V^{old}$ and the buffered precision setting value $p^{old}$ from processing the previous image are respectively 150 and 0.4. The current precision setting value for the element under test in the image at T=4 is 0.05; the current setting of the element under test in the image at T=4 is 143. In general, the setting of the element under test does not change much over this sequence of images. The signal processor compares the buffered value 150 to the new value 143. Since the difference of 7 (e.g., 150-143) is not greater than a threshold value (e.g., threshold value=20), the buffered values are not reset. Instead, in accordance with the calculations in FIG. 7B for the element under test at in the image at T=4, the signal processor sets the settings of the buffered setting value $v^{old}$ to 149 and the buffered precision setting value $p^{old}$ to 0.45.

In this instance, to produce the buffered setting value $v^{old}$ for the element under test at T=4, as shown, the signal processor applies different weights (e.g., normalized weights) to the settings 143, 149, 152, and 150 based on the corresponding precision metadata settings 0.05, 0.2, 0.1, and 0.1. To produce the buffered precision setting value $p^{old}$ for the image at T=4, the signal processor adds the precision setting values for each of the element settings in the sequence. In this example, the signal processor produces the buffered precision setting value by adding $p_1^{new}=0.1$, $p_2^{new}=0.1$, $p_3^{new}=0.2$, and $p_4^{new}=0.05$.

Thus, in accordance with one embodiment, the signal processor assigns a corresponding precision value to the buffered setting value (e.g., moving average) for the given element for the sequence of images based at least in part on a sum of the estimated precisions of each of the settings of the given element for each image in the sequence. For example, the precision metadata for the sequence of images including image at T=1, image at T=2, image at T=3, and image at T=4, is equal to $p_1^{new}+p_2^{new}+p_3^{new}+p_4^{new}$.

Thus, as the setting of the element under test stays within a threshold value range over time from one plane to the next, the buffered setting value $v^{old}$ remains relatively it is accumulative when the setting of a respective element does not change more than a threshold value amount), this indicates that the buffered setting value $v^{old}$ is stable (i.e., it well represents the "real value", since it was calculated by averaging out several samples and/or precise samples). That is, the larger the value of $p^{old}$, the higher the stability of setting as specified by $v^{old}$.

In one example embodiment, if the buffered setting value or moving average (e.g., v, or equivalently $v^{old}$ for the subsequent coordinate along dimension T) produced for the given element is relatively stable as indicated by the buffered precision setting value $p^{old}$, and thus is likely a better representation of a setting for the given element than a current setting $v^{new}$ of the given element in the image, the signal processor utilizes the generated setting value v instead of the current setting of the given element as a basis to encode a setting of the given element for the image. As an example, the signal processor uses the buffered setting values of 150, 151, 150, 149 . . . for each respective setting of the element instead of the values 150, 152, 149, 143, . . . .

Also, as an alternative to using the buffered setting values 150, 151, 150, 149 over the sequence, embodiments herein can include choosing a representative setting value such as the value 150. The representative value of 150 is assigned to the element to reduce a number of bits needed to encoded that portion of the signal. In other words, each of the buffered values potentially used for settings associated with the given element values 150, 151, 150, 149 . . . can be substituted with the value 150. This further reduces an amount of data needed to encode the given element in the signal.

Thus, embodiments herein can include characterizing transient components (e.g., noise, film grain, highly variable detailed information, etc.) and encoding a signal and/or component such as a particular element in a sequence with a reduced amount of transient components.

The same type of processing can be performed on each of the elements in a multidimensional signal.

As previously discussed, the estimated precision (e.g., precision metadata) associated with a respective setting of each element in a signal can be a statistical measurement indicating a probability or degree to which a respective setting of the multiple settings may include a significant component of noise. In a non-limiting embodiment, the statistical measurement can be generated based at least in part on an inverse of a variance.

In a more specific embodiment, when generating the setting value for the given element, the signal processor applies weight factors to each of the settings; the weight factors vary based at least in part on the estimated precisions of the settings for the given element.

As an example, processing of the image at T=2 (e.g., processing a sequence of 2 images) includes producing the normalized weight factors:

$[p_2^{new}/(p_1^{new}+p_2^{new})]$, and $[p_1^{new}/(p_1^{new}+p_2^{new})]$.

As another example, processing of the image at T=3 (e.g., processing a sequence of 3 images) includes producing the normalized weight factors:

$[p_3^{new}/(p_1^{new}+p_2^{new}+p_3^{new})]$, $[p_2^{new}/(p_1^{new}+p_2^{new}+p_3^{new})]$, and $[p_1^{new}/(p_1^{new}+p_2^{new}+p_3^{new})]$.

As another example, processing of the image at T=4 (e.g., processing a sequence of 4 images) includes producing the normalized weight factors:

$[p_4^{new}/((p_1^{new}+p_2^{new}+p_3^{new}+p_4^{new})]$, $[p_1^{new}/(p_1^{new}+p_2^{new}+p_3^{new}+p_4^{new})]$, $[p_2^{new}/(p_1^{new}+p_2^{new}+p_3^{new}+p_4^{new})]$, and $[p_4^{new}/(p_1^{new}+p_2^{new}+p_3^{new}+p_4^{new})]$.

As previously discussed with respect to FIG. 7, the signal processor sums the weight-adjusted settings of the element (e.g., multiplication of the weight factor by a respective setting of the element in a corresponding image of the sequence) to produce both stable value (e.g., v) and the buffered setting value (e.g., $v^{old}$) for the given element. Thus, embodiments herein can include generating the stable value and the buffered setting value for the given element based on different weightings of the settings of the element in the sequence As shown, the stable value, v, and the buffered setting value, $v^{old}$, for the given element over the sequence of images are weighted moving average values calculated based on weightings of the settings of the given element for each image in the sequence, if necessary accounting for motion occurred along the images of the sequence. A magnitude of each of the weightings applied to the settings varies depending at least in part on the estimated precision of each of the settings. The higher the precision value of a respective setting in the sequence, the greater the weight of that value used in generating the stable value v, and hence also the buffered setting value $v^{old}$.

The buffered setting value, $v^{old}$, for a given element is updated for each additional sample image in which the given element resides. For example, in one embodiment, the signal processor receives a next setting value and corresponding precision value assigned to the given element for a next contiguous image following a previously analyzed sequence of images. As shown, when generating the stable setting value, v, based on a combination of a weighting of the buffered setting value $v^{old}$ and a weighting of the next setting $v^{new}$ of the given element for the next contiguous image, the signal processor also updates the setting value assigned to the buffered element, $v^{old}$.

As previously mentioned, the setting value for the given element being analyzed can change significantly from one image to the next. This can occur due to several factors, such as a relevant change in the entities captured by the images. In such an embodiment, the moving average or setting value can be reset. As an alternative, the buffered values can be updated based on attributes of another image following the initial sequence of images on which the setting value for the given element is based.

For example, in accordance with a first sample case, assume that the signal processor receives a next setting value and corresponding precision value assigned to the given element for a subsequent plane (e.g., next image) following an initial sample sequence. The signal processor generates a difference value indicating a difference between the previously generated setting value (for a window of images such as images at time T1, T2, and T3) and the next setting value for the given element (in a next image at time T4 following the window of images at T1, T2, and T3). The signal processor compares the difference value (e.g., the difference between the setting for time T=4 and the buffered setting value for a combination of images at T1, T2, and T3) to a threshold value. Responsive to detecting that the difference value is less than the threshold value, in a manner as previously discussed, the signal processor updates the setting value assigned to the given element based at least in part on a combination of the previously generated setting value (e.g., the buffered setting value for a combination of images at T1, T2, and T3) and a weighting of the next setting of the given element (e.g., setting of the element at time T=4).

Alternatively, in accordance with a second example case, assume the signal processor receives a next setting value and corresponding precision value assigned to the given element for a next contiguous image (e.g., the image at T=5) following the sequence of images before and include T=4. Assume that the setting of the given element at T=5 is 250. In this example, the signal processor would generate a difference value indicating a difference between the generated setting value (149 for the window images up to and including T=4) and the next setting value 250 for the given element (in a next image at T=5 following the window of images). The signal processor compares the difference (e.g., 250-149) value to a threshold value. Assume that the threshold value is set to 25. Responsive to detecting that the difference value is greater than the threshold value (e.g., assume 25 in this example), the signal processor resets the buffered setting value and updates the setting value for the given element at T=5 to be equal to the next setting value (e.g., the value 250) for the given element. Thus, when the difference is above a threshold value for the next sampling, the signal processor disregards the previous settings and starts a new sequence. In other words, the signal processor can be configured to start process settings in a new string of elements residing in a next sequence of images in response to detecting a substantial change in a setting from one image or frame to the next.

Note again that the given element in the image can represent an entity (e.g., object, etc.) residing at different position coordinates of each image in the sequence. For example, in accordance with one embodiment, the signal processor can be configured to utilize motion vector information associated with the sequence of images to identify the different position coordinates of the given element in each image of the sequence. In such an embodiment, the motion vector information informs the signal processor where the element under test (e.g., given element) moves from one image to the next.

Additional details of encoding/decoding of the images, motion maps, etc., associated with the images can be found in the related applications that are incorporated herein by this reference.

Embodiments herein can further include analyzing variations in the settings of the images to identify attributes of transient components in the settings and encode a signal with reduced transient components. As mentioned, the signal processor can process the settings across multiple images to produce more stable value settings.

In such an embodiment, the signal processor can be configured to characterize the transient components (e.g., noise, film grain, highly variable details, etc.) that are removed to produce the encoded signal. As an example of characterizing the transient components, the signal processor can be configured to determine a distribution of the transient components present in the signal based on a difference between the buffered setting values of 150, 151, 150, 149 . . . for each respective setting of the element and the original setting values 150, 152, 149, 143, . . . . The transient component distribution can be captured as parameters of an equation (or other suitable means) that requires relatively few data bits of information to encode.

Upon subsequent rendering of the sequence of multiple images during playback, a decoder and/or playback device can be configured to reproduce the signal (e.g., with transient components removed) and then add back the transient components into the decoded signal based on a transient component distribution as specified by the equation. In accordance with such an embodiment, the transient components injected into the decoded signal will enable playback of a rendition of the sequence of multiple images during playback so that the signal played back appears similar or identical to the original signal that included the transient components. Thus, in the non-limiting example of a video signal, the original "look and feel" of a video containing acquisition noise and film grain can be maintained, using yet fewer bits of information during encoding and decoding.

Another benefit of removing the transient components from the signal is to provide increased picture quality. Accordingly, in certain cases, it may not be desirable to add back the detected transient components in a signal when encoding and/or playing back content (e.g., medical imaging, scientific imaging, etc.).

Figure 8A:
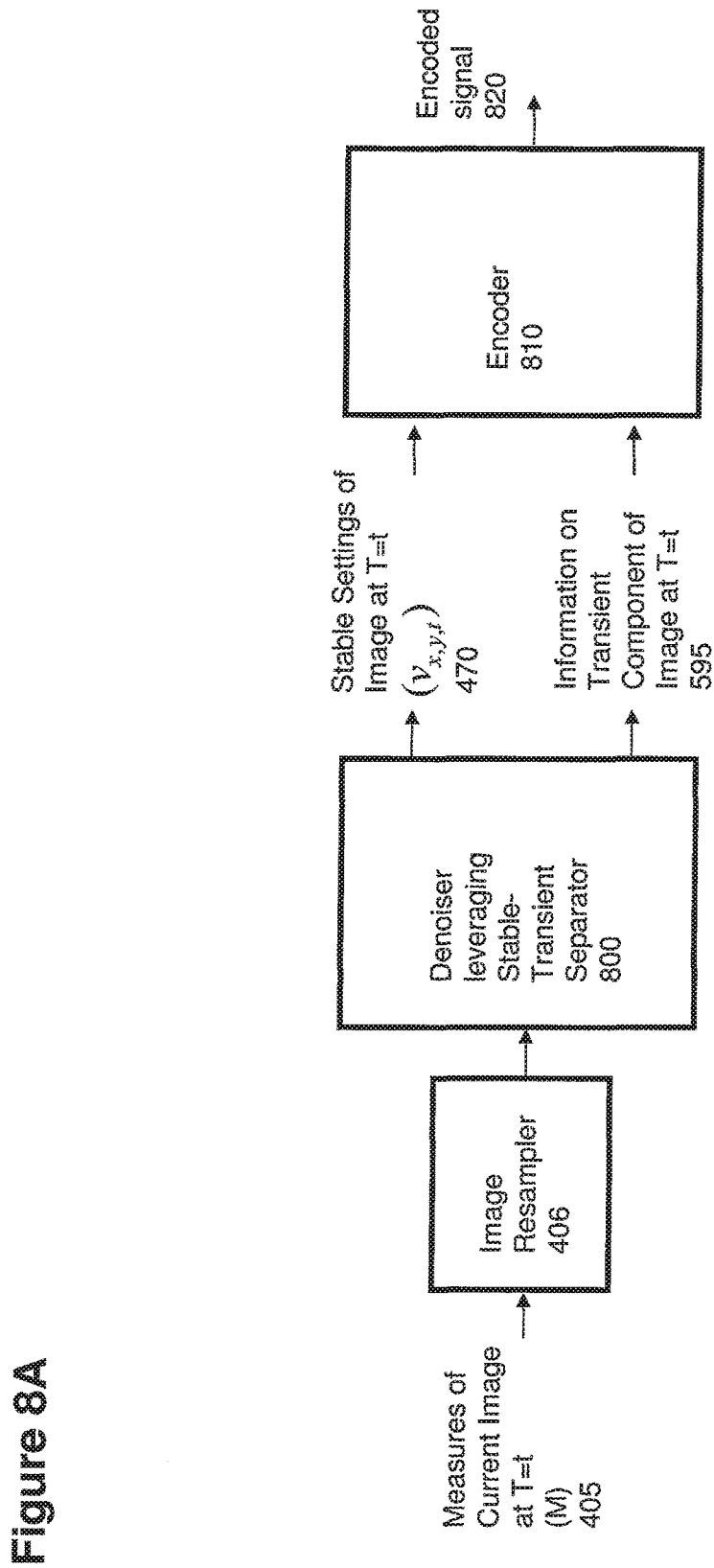
FIGS. 8A and 8B are example diagrams illustrating encoding and decoding according to embodiments herein.

FIG. 8A is a diagram illustrating an example of encoding a signal according to embodiments herein.

For example, image sampler 406 receives settings of images at different time frames. Based on input from the image re-sampler 406, the transient separator 800 produces stable value settings 470 for the elements in the images in a manner as previously discussed. The transient separator 800 also produces information 595 representing the transient components associated with the elements in the images. Encoder 810 receives the stable settings 470 and the information 595 and produces encoded signal 820.

Note that any suitable method can be used to perform encoding and decoding according to embodiments herein. By way of a non-limiting example, additional details of encoding/decoding of the images, motion maps, etc., associated with the images can be found in the related applications that are incorporated herein by this reference.

Figure 8B:
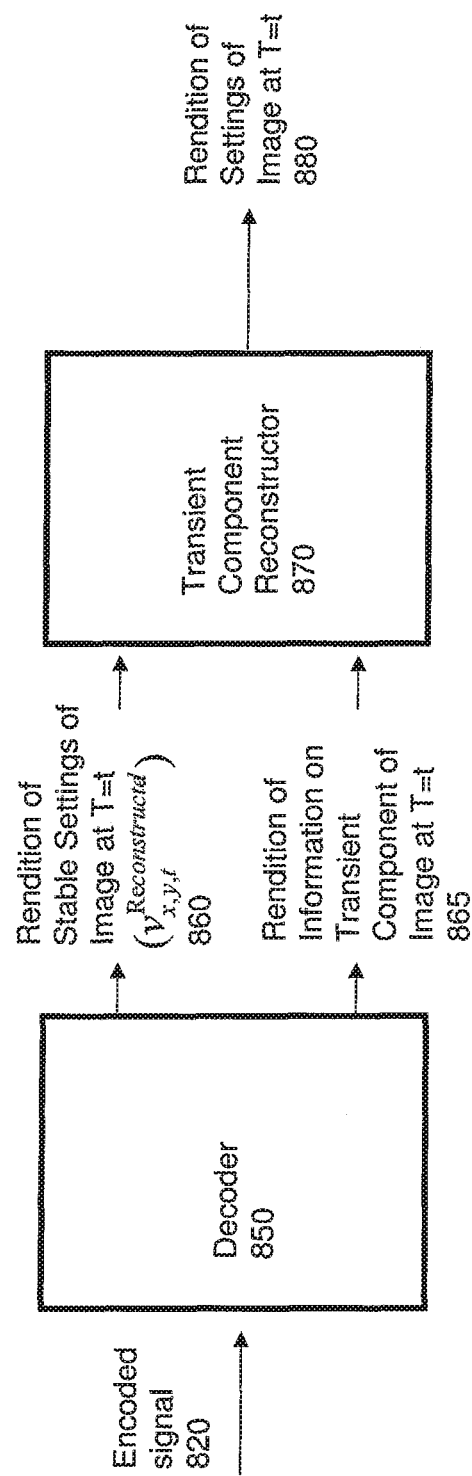

FIG. 8B is a diagram illustrating an example of decoding an encoded signal according to embodiments herein.

As shown, the decoder 850 receives encoded signal 820. The decoder 850 decodes the encoded signal 820 into a rendition of the stable settings 860 (i.e., original image settings with transient components removed) and a rendition of the transient component information 865 associated with the original image settings. Based on both the stable settings 860 and the transient component information 865, the transient component reconstructor 870 produces a rendition of the settings 880 for playback on a playback device.

Figure 9:
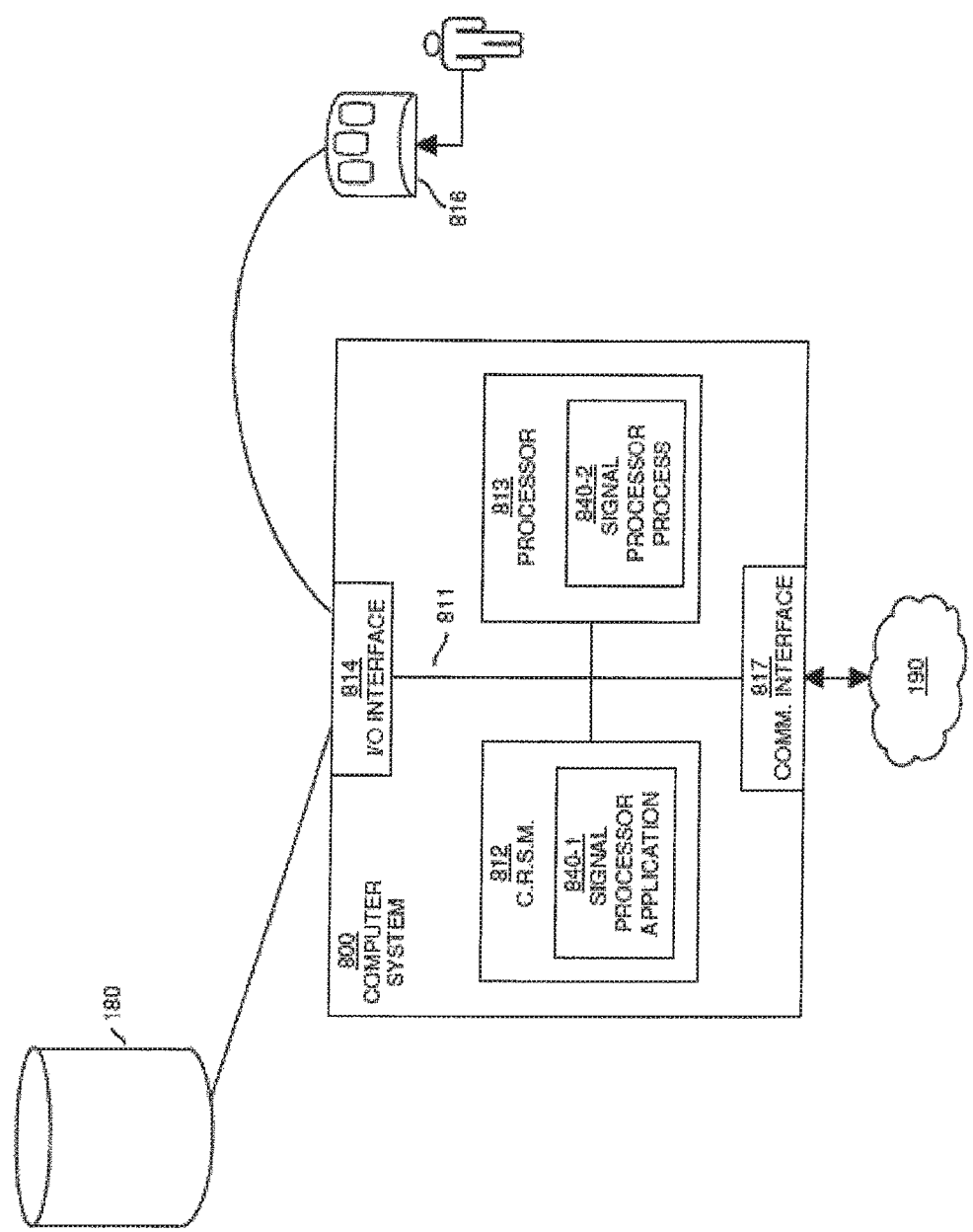
FIG. 9 is an example diagram illustrating of an architecture to perform processing according to embodiments herein.

FIG. 9 is an example block diagram of a computer system 800 that provides computer processing according to embodiments herein.

Computer system 800 can be or include a computerized device such as a personal computer, processing circuitry, television, playback device, encoding device, workstation, portable computing device, console, network terminal, processing device, network device, operating as a switch, router, server, client, etc.

Note that the following discussion provides a basic embodiment indicating how to carry out functionality associated with signal processor 813 as previously discussed. However, it should be noted that the actual configuration for carrying out the operations as described herein can vary depending on a respective application.

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817.

I/O interface 814 provides connectivity to repository 180, and if present, display screen, peripheral devices 816 such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with a signal processor as discussed herein. The instructions are executed by a respective resource such as signal processor 813 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with signal processor application 140-1 executed by processor 813 as signal processor process 840-2.

Note that the computer system 800 or Stable Transient Separator 400 also can be embodied to include a computer readable storage medium 812 (e.g., a hardware storage media, non-transitory storage media, etc.) for storing data and/or logic instructions.

Computer system 800 can include a processor 813 to execute such instructions and carry out operations as discussed herein. Accordingly, when executed, the code associated with signal processor application 840-1 can support processing functionality as discussed herein. As mentioned, signal processor 1400 can be configured to support encoding and/or decoding.

During operation of one embodiment, processor 813 accesses computer readable storage media 812 via the use of interconnect 811 in order to launch, run, execute, interpret or otherwise perform the instructions of signal processor application 840-1 stored in computer readable storage medium 812. Execution of the signal processor application 840-1 produces processing functionality in processor 813. In other words, the encoder process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system that controls allocation and use of hardware processing resources to execute signal processor application 840-1.

Functionality supported by the network management application 140 will now be discussed via flowcharts in FIGS. 10-11. Note that the steps in the flowcharts below can be executed in any suitable order.

Figure 10:
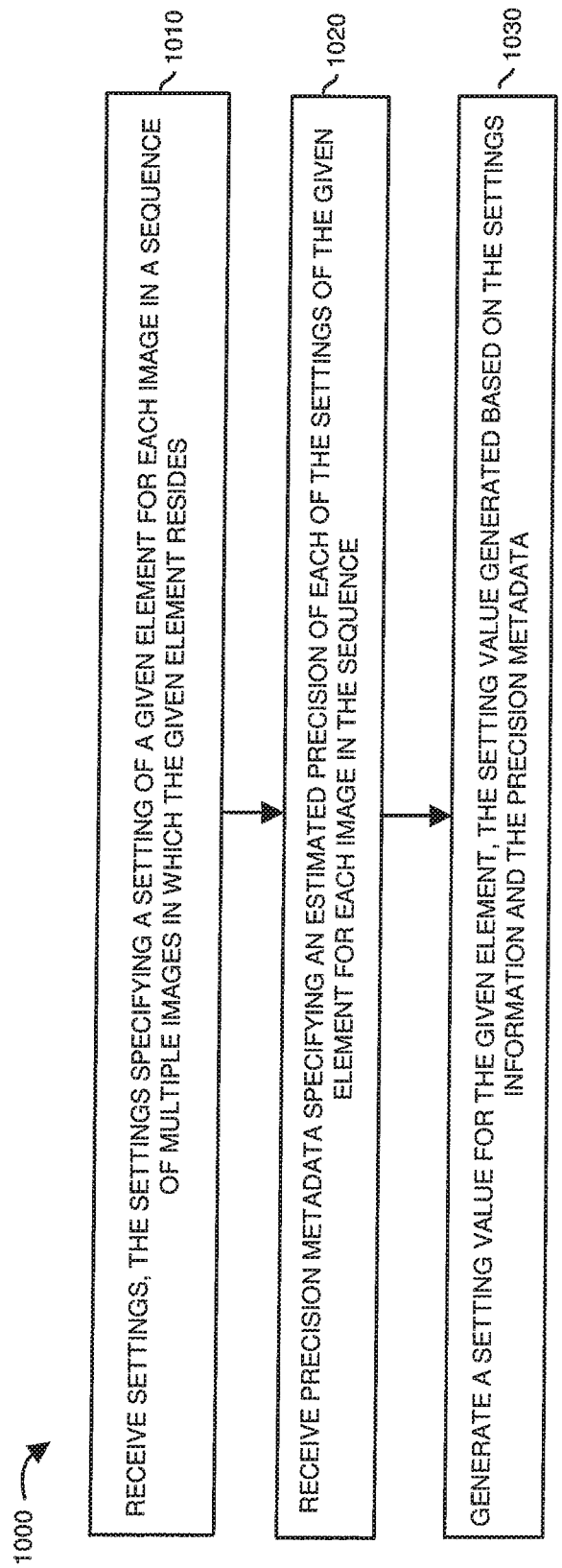
FIGS. 10 and 11 are example diagrams depicting example methods according to embodiments herein.

FIG. 10 is an example diagram illustrating a method of tracking the stability of a respective element in a signal according to embodiments herein. Note that there will be some overlap with respect to concepts as discussed above.

In step 1010, the signal processor (e.g., separator 400) receives settings such as v. The settings specify a setting of a given element for each image in a sequence of multiple images in which the given element resides.

In step 1020, the signal processor receives precision metadata specifying an estimated precision of each of the settings of the given element for each image in the sequence.

In step 1030, the signal processor generates a setting value for the given element; the setting value is generated based on the settings information and the precision metadata.

Figure 11:
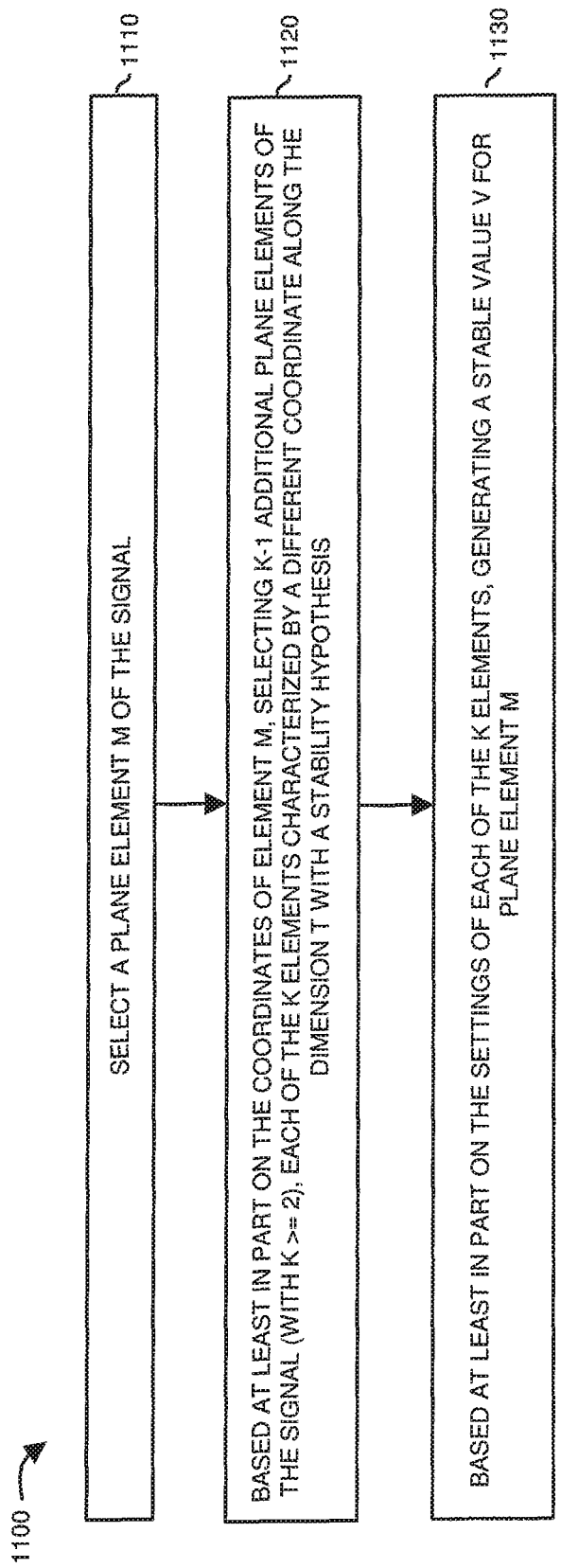

FIG. 11 is an example diagram illustrating a method of tracking the stability of a respective element in a signal according to embodiments herein. Note that there will be some overlap with respect to concepts as discussed above.

In one embodiment, the signal processor generates, per each element m of a multidimensional signal, a stable value v, based on a stability hypothesis along one of the dimensions T of the signal.

In step 1110, the signal processor (e.g., separator 400), selects a plane element m of the signal.

In step 1120, based at least in part on the coordinates of element m, the signal processor selects k−1 additional plane elements of the signal (with k≥2), each of the k elements characterized by a different coordinate along the dimension t with a stability hypothesis.

In step 1130, based at least in part on the settings of each of the k elements, the signal processor generates a stable value v for plane element m.

In accordance with different embodiments, note that computer system may be any of various types of devices, including, but not limited to, a personal computer system, desktop computer, laptop, notebook, netbook computer, mainframe computer system, handheld computer, tablet, smartphone, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Note again that techniques herein are well suited for use in separating the stable components of signals from transient components. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "analyzing" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of generating, per each image element m of a multidimensional image signal, a stable value v, based on a stability hypothesis along a dimension T of the image signal, the method comprising:
   receiving a plane element m of the image signal, the plane element m being one of k plane elements;
   based at least in part on coordinates of image element m, receiving k−1 additional plane elements of the image signal (with k≥2), the additional k−1 plane elements included in the k image elements, each of the k plane elements characterized by a different coordinate along the dimension T with a stability hypothesis;
   based at least in part on settings of each of the k image elements, generating the stable value, v, for plane element m; and
   utilizing the stable setting value, v, over a sequence of multiple images for plane element, m, instead of an original setting of the plane element m, as a basis to encode a setting of the plane element m in multiple images.

2. The method as in claim 1, wherein the k plane elements are located one subsequent to another along the dimension T with the stability hypothesis.

3. The method as in claim 1, wherein a contribution of each of the k plane elements to the stable value, v, depends at least in part on statistical parameters associated with the stable value, the method further comprising:
  receiving a plane element m+1 of the image signal;
  based at least in part on the coordinates of element m+1, receiving the k−1 additional plane elements from the image signal, each of the k plane elements characterized by a different coordinate along the dimension T with stability hypothesis;
  based at least in part on the settings of each of the k elements and on statistical parameters associated to each element, generating a stable value v+1 for plane element m+1.

4. The method as in claim 3, wherein statistical parameters associated to each plane element include information on the precision of each plane element.

5. The method as in claim 3, wherein the k plane elements received and the contribution of each of the k plane elements to the stable value v depend at least in part on settings of element m, the method comprising:
  receiving a plane element m of the image signal;
  based at least in part on the coordinates of plane element m and on settings of m, receiving the k−1 additional plane elements from the image signal, each of the k plane elements characterized by a different coordinate along the dimension T with stability hypothesis;
  based at least in part on the settings of each of the k plane elements and on statistical parameters associated to each plane element, generating a stable value v for plane element m.

6. The method as in claim 3, wherein the stable value associated to each image element m is generated by weighing the settings of each of the k plane elements based on statistical parameters associated to each of the k plane elements.

7. The method as in claim 6, wherein the weights associated to image elements whose settings differ from settings of element m beyond a threshold are set to zero, the threshold depending at least in part on estimated statistical properties of measures of the image signal for image elements with the same coordinate along dimension T as plane element m.

8. The method as in claim 3, wherein each of the k−1 plane elements selected to generate the stable value, v, for plane element m is identified by leveraging suitable motion vectors, the method comprising:
  receiving a plane element m of the signal;
  based at least in part on the coordinates of image element m, on settings of m and on a motion vector associated to element m, receiving at least one additional plane element i of the image signal, characterized by a preceding or subsequent coordinate along the dimension T with stability hypothesis;
  up until k plane elements have been received (with k≥2), based at least in part on coordinates of a last selected plane element, on settings of the last selected plane element and on a motion vector associated to it, receiving at least one additional plane element j of the image signal, characterized by a preceding or subsequent coordinate along the dimension T with stability hypothesis;
  based at least in part on settings of each of the identified plane elements and on statistical parameters associated to each plane element, generating a stable value v for plane element m.

9. The method as in claim 1, wherein the stable value associated to each plane element m is generated based at least in part on settings contained in a buffer $v^{old}$ associated to the coordinate of plane element m along dimension T, the method comprising:
  selecting a plane M of the signal for a given coordinate t along dimension T;
  selecting, within M, a plane element m of the image signal;
  identifying buffer $V^{old}$ corresponding to plane M of the image signal;
  based at least in part on the coordinates of plane element m, selecting an plane element $v^{old}$ in buffer $V^{old}$;
  based at least in part on settings of m, on settings of $v^{old}$, and on suitable weight parameters associated to settings of m and $v^{old}$, generating the stable value v for plane element m.

10. The method as in claim 9, wherein the weight parameters depend on statistical parameters such as estimated precisions of m and $v^{old}$.

11. The method as in claim 8, wherein a weight parameter associated to $v^{old}$ is set to zero whenever settings of m and $v^{old}$ differ beyond a threshold, the threshold depending at least in part on estimated statistical properties of m and $v^{old}$.

12. The method as in claim 8, wherein a buffer $P^{old}$ contains a plane of image elements $p^{old}$, each image element $p^{old}$ of buffer $P^{old}$ corresponding to an image element $v^{old}$ of buffer $V^{old}$, the method comprising:
  selecting a plane M of the signal for a given coordinate t along dimension T;
  selecting within M a plane element m of the signal;
  identifying buffer $V^{old}$ corresponding to plane M of the signal;
  based at least in part on the coordinates of plane element m, selecting an image element $v^{old}$ in buffer $V^{old}$;
  identifying buffer $P^{old}$ corresponding to plane $V^{old}$;
  based at least in part on the coordinates of image element $v^{old}$, selecting an image element $V^{old}$ in buffer $P^{old}$ associated to element $v^{old}$;
  based at least in part on settings of m, on settings of $v^{old}$, and on suitable weight parameters associated to settings of m and $v^{old}$, generating a stable value v for plane image element m, the weight parameter associated to $v^{old}$ depending at least in part on settings of element $p^{old}$.

13. The method as in claim 8, wherein the weight parameters associated to settings of m depend at least in part on statistical properties $p^{new}$ of the plane of differences between signal measures and corresponding generated stable values for a coordinate along dimension T neighboring the coordinate along dimension T of element m.

14. The method as in claim 8, wherein settings of buffer $V^{old}$ for a given coordinate t along dimension T are generated by adjusting, based at least in part on the contents of an auxiliary map associated with the image signal, the plane of stable settings V generated for the plane M of elements of the image signal with coordinate T=t.

15. The method as in claim 13, wherein settings of buffer $P^{old}$ for a given coordinate t along dimension T are generated by adjusting, based at least in part on the contents of an auxiliary map associated with the image signal, a plane of settings generated based at least in part on the settings of buffer $P^{old}$ for a neighboring coordinate (e.g., t−1 or t+1) of coordinate t along dimension T.

16. The method as in claim 13, wherein stable values are generated with a resolution that is different from the resolution of the image signal, the method comprising:

selecting a plane M of the signal for a given coordinate t along dimension T;

identifying buffer $V^{new}$ corresponding to plane M of the image signal, buffer $V^{new}$ featuring a resolution (i.e., number of elements along the various coordinates) that is different from the resolution of plane M;

generating settings for buffer $V^{new}$ based at least in part on settings of plane M;

selecting within $V^{new}$ a plane element $v^{new}$;

identifying buffer $V^{old}$ corresponding to plane M of the image signal, buffer $V^{old}$ featuring a same resolution as buffer $V^{new}$;

based at least in part on the coordinates of element $v^{new}$, selecting an element $v^{old}$ in buffer $V^{old}$;

identifying buffer $P^{old}$ corresponding to plane $V^{old}$, buffer $P^{old}$ featuring the same resolution as buffer $V^{new}$ and $V^{old}$;

based at least in part on the coordinates of element $v^{old}$, selecting an element $p^{old}$ in buffer $P^{old}$ associated to element $v^{old}$;

based at least in part on the settings of $v^{new}$, on the settings of $v^{old}$, and on suitable weight parameters associated to settings of $v^{new}$ and $v^{old}$, generating a stable value v corresponding to plane element $v^{new}$, the weight parameter associated to $v^{old}$ depending at least in part on settings of element $p^{old}$.

17. The method as in claim 1, wherein based at least in part on the difference between stable settings v and corresponding settings of elements of the image signal, information on transient component of the signal is generated, the method comprising:

selecting a plane M of the signal for a given coordinate t along dimension T;

generating for each element m of plane M a stable value v;

based at least in part on differences between settings of plane M and their corresponding stable values, generating information TC on transient component of plane M.

18. The method as in claim 17, wherein information TC includes parameters indicating the spectral distribution of differences between settings of plane M and their corresponding stable values.

19. The method as in claim 17, wherein information TC includes reconstruction data to reconstruct a tiered hierarchy of renditions of differences between settings of plane M and their corresponding stable values, according to a method of tiered signal decoding and signal reconstruction.

20. The method as in claim 1, wherein the stable value, v, represents a core setting for the plane element, m, over multiple images in the image signal, the core setting separated from corresponding transient information associated with the plane element m.

21. A system comprising:
computer processor hardware;
computer-readable storage hardware having instructions stored thereon, the instructions, when carried out by the computer processor hardware, cause the computer processor hardware to:
receive a plane element m of an image signal, the plane element m being one of k image elements;
based at least in part on coordinates of plane element m, receive k−1 additional plane elements of the image signal (with k≥2), the additional k−1 plane elements included in the k plane elements, each of the k plane elements characterized by a different coordinate along the dimension T with a stability hypothesis;
based at least in part on settings of each of the k plane elements, generate a stable value v for plane element m; and
utilize the stable setting value, v, over a sequence of multiple images for plane element, m, instead of an original setting of the plane element m, as a basis to encode a setting of the plane element m in multiple images.

22. Non-transitory computer-readable storage media having instructions stored thereon, the instructions, when carried out by computer processor hardware, cause the computer processor hardware to generate, per each image element m of a multidimensional image signal, a stable value v, based on a stability hypothesis along a dimension T of the image signal by:
receive a plane element m of the image signal, the plane element m being one of k plane elements;
based at least in part on the coordinates of image element m, receive k−1 additional plane elements of the image signal (with k≥2), the additional k−1 plane elements included in the k plane elements, each of the k plane elements characterized by a different coordinate along the dimension T with a stability hypothesis;
based at least in part on the settings of each of the k image elements, generate the stable value v for plane element m; and
utilize the stable setting value, v, over a sequence of multiple images for plane element, m, instead of an original setting of the plane element m, as a basis to encode a setting of the plane element m in multiple images.

* * * * *